United States Patent
Zhou et al.

(10) Patent No.: US 12,160,613 B2
(45) Date of Patent: Dec. 3, 2024

(54) VIDEO DECODING APPARATUS AND VIDEO CODING APPARATUS

(71) Applicant: SHARP KABUSHIKI KAISHA, Sakai (JP)

(72) Inventors: Tianyang Zhou, Sakai (JP); Tomohiro Ikai, Sakai (JP); Eiichi Sasaki, Sakai (JP); Tomonori Hashimoto, Sakai (JP); Takeshi Chujoh, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 48 days.

(21) Appl. No.: 18/007,552

(22) PCT Filed: May 27, 2021

(86) PCT No.: PCT/JP2021/020218
§ 371 (c)(1),
(2) Date: Dec. 1, 2022

(87) PCT Pub. No.: WO2021/246284
PCT Pub. Date: Dec. 9, 2021

(65) Prior Publication Data
US 2023/0239504 A1      Jul. 27, 2023

(30) Foreign Application Priority Data

Jun. 2, 2020 (JP) ................................. 2020-095974
Jun. 12, 2020 (JP) ................................. 2020-102333
(Continued)

(51) Int. Cl.
*H04N 19/60*     (2014.01)
*H04N 19/18*     (2014.01)
*H04N 19/46*     (2014.01)

(52) U.S. Cl.
CPC ............. *H04N 19/60* (2014.11); *H04N 19/18* (2014.11); *H04N 19/46* (2014.11)

(58) Field of Classification Search
CPC ........ H04N 19/60; H04N 19/18; H04N 19/46; H04N 19/103
See application file for complete search history.

(56) References Cited

U.S. PATENT DOCUMENTS 9,497,455 B2 * 11/2016 Yamazaki ............ H04N 19/182
2016/0261876 A1 * 9/2016 Nakagami ............ H04N 19/105
(Continued)

FOREIGN PATENT DOCUMENTS

CA       2933563 C  *  2/2022    .......... H04N 19/105

OTHER PUBLICATIONS

"High Efficiency Coding (Draft 7)", ITU-T - H.265 v7, Nov. 2019 (Year: 2019).*
(Continued)

*Primary Examiner* — Dramos Kalapodas
(74) *Attorney, Agent, or Firm* — ScienBiziP, P.C.

(57) ABSTRACT

An image decoding apparatus capable of more preferably applying inverse non-separable transform and techniques related thereto are provided. A video decoding apparatus includes a header decoder configured to decode a flag indicating a high accuracy coding mode from a sequence parameter set SPS, a scaling processing unit configured to perform inverse quantization on a transform coefficient for each transform block, and an inverse transform processing unit configured to perform inverse transform. The scaling processing unit switches whether a variable for indicating a range of the transform coefficient depends on a bit depth or does not depend on the bit depth, based on the flag and a size of the transform block.

2 Claims, 14 Drawing Sheets

(30) Foreign Application Priority Data

Aug. 6, 2020 (JP) .................................. 2020-133691
Oct. 7, 2020 (JP) .................................. 2020-169522

(56) References Cited

U.S. PATENT DOCUMENTS

2021/0352305 A1* 11/2021 Li .......................... H04N 19/70
2022/0303567 A1* 9/2022 Jung ...................... H04N 19/70

OTHER PUBLICATIONS

Benjamin Bross, et al., "Versatile Video Coding, (Draft 10)" JVET-S2001-vH 2020 (Year: 2020).*
Benjamin Bross et al., "Versatile Video Coding (Draft 10)", JVET-S2001-vH, Joint Video Experts Team (JVET), of ITU-T SG 16 WP 3 and ISO/IEC JTC 1/SC 29/WG 11, 19th Meeting: by teleconference, Jun. 22-Jul. 1, 2020.
International Telecommunication Union, ITU-T, Telecommunication Standardization Sector of ITU, H.265, (Nov. 2019).

* cited by examiner (a)

|  | 8 | 9 | 10 | 11 | 12 | 13 | 14 | 15 | 16 |
|---|---|---|---|---|---|---|---|---|---|
| log2TransformRange | 15 | | | | | | | | |
| bdShift1a | 3 | 4 | 5 | 6 | 7 | 8 | 9 | 10 | 11 |
| bdShift2 | 12 | 11 | 10 | 9 | 8 | 7 | 6 | 5 | 4 |
| TOTAL | 15 | 15 | 15 | 15 | 15 | 15 | 15 | 15 | 15 |

(b)

|  | 8 | 9 | 10 | 11 | 12 | 13 | 14 | 15 | 16 |
|---|---|---|---|---|---|---|---|---|---|
| log2TransformRange | Max (15, BitDepth + 6) | | | | | | | | |
|  | 15 | 15 | 16 | 17 | 18 | 19 | 20 | 21 | 22 |
| bdShift1a | 3 | 4 | 4 | 4 | 4 | 4 | 4 | 4 | 4 |
| bdShift2 | 12 | 11 | 11 | 11 | 11 | 11 | 11 | 11 | 11 |
| TOTAL | 15 | 15 | 15 | 15 | 15 | 15 | 15 | 15 | 15 |

|  | 8 | 9 | 10 | 11 | 12 | 13 | 14 | 15 | 16 |
|---|---|---|---|---|---|---|---|---|---|
| log2Transformრange | BitDepth + 5 | | | | | | | | |
| | 13 | 14 | 15 | 16 | 17 | 18 | 19 | 20 | 21 |
| bdShift1a | 5 | 5 | 5 | 5 | 5 | 5 | 5 | 5 | 5 |
| bdShift2 | 10 | 10 | 10 | 10 | 10 | 10 | 10 | 10 | 10 |
| TOTAL | 15 | 15 | 15 | 15 | 15 | 15 | 15 | 15 | 15 |

(b) NC=6

|  | 8 | 9 | 10 | 11 | 12 | 13 | 14 | 15 | 16 |
|---|---|---|---|---|---|---|---|---|---|
| log2TransformormRange | BitDepth + 6 | | | | | | | | |
| | 14 | 15 | 16 | 17 | 18 | 19 | 20 | 21 | 22 |
| bdShift1a | 4 | 4 | 4 | 4 | 4 | 4 | 4 | 4 | 4 |
| bdShift2 | 11 | 11 | 11 | 11 | 11 | 11 | 11 | 11 | 11 |
| TOTAL | 15 | 15 | 15 | 15 | 15 | 15 | 15 | 15 | 15 |

(c) NC=10

|  | 8 | 9 | 10 | 11 | 12 | 13 | 14 | 15 | 16 |
|---|---|---|---|---|---|---|---|---|---|
| log2TransformormRange | BitDepth + 10 | | | | | | | | |
| | 18 | 19 | 20 | 21 | 22 | 23 | 24 | 25 | 26 |
| bdShift1a | 0 | 0 | 0 | 0 | 0 | 0 | 0 | 0 | 0 |
| bdShift2 | 15 | 15 | 15 | 15 | 15 | 15 | 15 | 15 | 15 |
| TOTAL | 15 | 15 | 15 | 15 | 15 | 15 | 15 | 15 | 15 |

|  | 8 | 9 | 10 | 11 | 12 | 13 | 14 | 15 | 16 |
|---|---|---|---|---|---|---|---|---|---|
| log2TransformRange | 21 | | | | | | | | |
| bdShift1a | 5 | 5 | 5 | 5 | 5 | 5 | 5 | 5 | 5 |
| bdShift2 | 10 | 10 | 10 | 10 | 10 | 10 | 10 | 10 | 10 |
| TOTAL | 15 | 15 | 15 | 15 | 15 | 15 | 15 | 15 | 15 |

(b) NC=11

|  | 8 | 9 | 10 | 11 | 12 | 13 | 14 | 15 | 16 |
|---|---|---|---|---|---|---|---|---|---|
| log2TransformRange | 22 | | | | | | | | |
| bdShift1a | 4 | 4 | 4 | 4 | 4 | 4 | 4 | 4 | 4 |
| bdShift2 | 11 | 11 | 11 | 11 | 11 | 11 | 11 | 11 | 11 |
| TOTAL | 15 | 15 | 15 | 15 | 15 | 15 | 15 | 15 | 15 |

(c) NC=15

|  | 8 | 9 | 10 | 11 | 12 | 13 | 14 | 15 | 16 |
|---|---|---|---|---|---|---|---|---|---|
| log2TransformRange | 26 | | | | | | | | |
| bdShift1a | 0 | 0 | 0 | 0 | 0 | 0 | 0 | 0 | 0 |
| bdShift2 | 15 | 15 | 15 | 15 | 15 | 15 | 15 | 15 | 15 |
| TOTAL | 15 | 15 | 15 | 15 | 15 | 15 | 15 | 15 | 15 |

FIG. 14

VIDEO DECODING APPARATUS AND VIDEO CODING APPARATUS

TECHNICAL FIELD

The present disclosure relates to a video decoding apparatus and a video coding apparatus. This application claims priority based on Japanese Patent Application No. 2020-095974 filed on Jun. 2, 2020, Japanese Patent Application No. 2020-102333 filed on Jun. 12, 2020, Japanese Patent Application No. 2020-133691 filed on Aug. 6, 2020, and Japanese Patent Application No. 2020-169522 filed on Oct. 7, 2020, the contents of which are incorporated herein by reference.

BACKGROUND ART

An image coding apparatus which generates coded data by coding an image, and an image decoding apparatus which generates decoded images by decoding the coded data are used for efficient transmission or recording of images.

Specific image coding schemes include, for example, H.264/AVC and a High-Efficiency Video Coding (HEVC) scheme, and the like.

In such an image coding scheme, images (pictures) constituting an image are managed in a hierarchical structure including slices obtained by splitting an image, coding tree units (CTUs) obtained by splitting a slice, units of coding (coding units; which will be referred to as CUs) obtained by splitting a coding tree unit, and transform units (TUs) obtained by splitting a coding unit, and are coded/decoded for each CU.

In such an image coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

Examples of image coding and decoding techniques of recent years include NPL 1 (VVC) and NPL 2 (HEVC). NPL 1 discloses a technique of achieving a balance of shift values after first and second transforms and a value range and accuracy of operation results by clipping after the first transform in separable transform (DCT transform) in which transforms of the horizontal direction and the vertical direction are separately performed. NPL 2 further discloses a technique of adjusting the two shift values and the clipping range depending on an extended_precision_processing_flag flag so as to enhance accuracy.

CITATION LIST

Non Patent Literature

NPL 1: "Versatile Video Coding (Draft 10)", JVET-S2001-v17, Joint Video Exploration Team (JVET) of ITU-T SG 16 WP 3 and ISO/IEC JTC 1/SC 29/WG 11, 2020 Sep. 4 07:47:46

NPL 2: H.265: High efficiency video coding, 2019-Nov. 29

SUMMARY OF INVENTION

Technical Problem

In NPL 1, there is a problem in that a range of a transform coefficient is insufficient, and accuracy of the transform coefficient reduces in a case of a high bit depth. In NPL 2, although calculation of accuracy higher than NPL 1 can be performed, a bit depth and a shift value are not fixed and processing is thus complicated. Accuracy of a right shift amount after transform may be significantly reduced.

The configuration of changing operation depending on the extended_precision_processing_flag flag requires decoding and coding of coded data whose operation is different even in a case of having the same bit depth, and thus there is a problem in that the operation becomes complicated.

An aspect of the present invention has an object to provide a video decoding apparatus and a video coding apparatus whose processing is easy and that enhance operation accuracy of transform coefficients in a case of a high bit depth.

Solution to Problem

A video decoding apparatus according to an aspect of the present invention includes a header decoder configured to decode a flag indicating a high accuracy coding mode from a sequence parameter set SPS, a scaling processing unit configured to perform inverse quantization on a transform coefficient for each transform block, and an inverse transform processing unit configured to perform inverse transform. The scaling processing unit switches whether a variable for indicating a range of the transform coefficient depends on a bit depth or does not depend on the bit depth, based on the flag and a size of the transform block.

Advantageous Effects of Invention

According to the configuration described above, any one of the problems described above can be solved.

BRIEF DESCRIPTION OF DRAWINGS

FIG. 12 is a diagram illustrating a configuration example of a clipping value and shift values according to a first embodiment of the present invention.

FIG. 13 is a diagram illustrating a configuration example of a clipping value and shift values according to a second embodiment of the present invention.

FIG. 14 is a diagram illustrating a configuration example of a clipping value and shift values according to a third embodiment of the present invention.

DESCRIPTION OF EMBODIMENTS

First Embodiment

Hereinafter, an embodiment of the present invention will be described with reference to the drawings.

Figure 1:
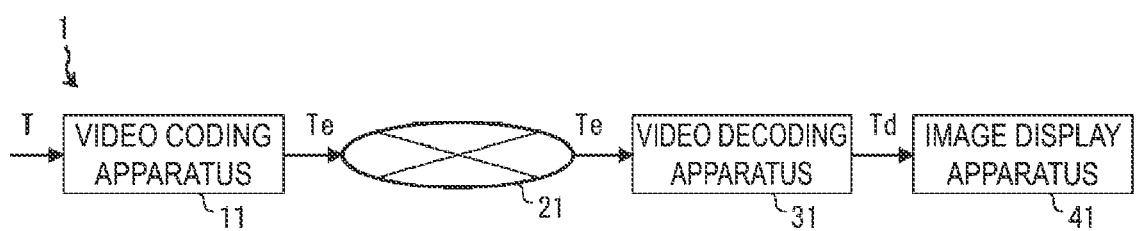
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and an image display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bi-directional communication network, and may be a unidirectional communication network configured to transmit broadcast waves of digital terrestrial television broadcasting, satellite broadcasting of the like. Furthermore, the network 21 may be substituted by a storage medium in which the coding stream Te is recorded, such as a Digital Versatile Disc (DVD: trade name) or a Blue-ray Disc (BD: trade name).

The video decoding apparatus 31 decodes each of the coding streams Te transmitted from the network 21 and generates one or multiple decoded images Td.

The image display apparatus 41 displays all or part of one or multiple decoded images Td generated by the video decoding apparatus 31. For example, the image display apparatus 41 includes a display device such as a liquid crystal display and an organic Electro-Luminescence (EL) display. Forms of the display include a stationary type, a mobile type, an HMD type, and the like. In addition, in a case that the video decoding apparatus 31 has a high processing capability, an image having high image quality is displayed, and in a case that the apparatus has a lower processing capability, an image which does not require high processing capability and display capability is displayed.

Operator

Operators used in the present specification will be described below.

$>>$ is a right bit shift, $<<$ is a left bit shift, & is a bitwise AND, | is a bitwise OR, |= is an OR assignment operator, and || indicates a logical sum.

x?y:z is a ternary operator that takes y in a case that x is true (other than 0) and takes z in a case that x is false (0).

Clip3(a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs (a) is a function that returns the absolute value of a.

Int (a) is a function that returns the integer value of a.

floor (a) is a function that returns a minimum integer equal to or less than a.

ceil(a) is a function that returns a maximum integer greater than or equal to a.

a/d represents division of a by d (round down decimal places).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
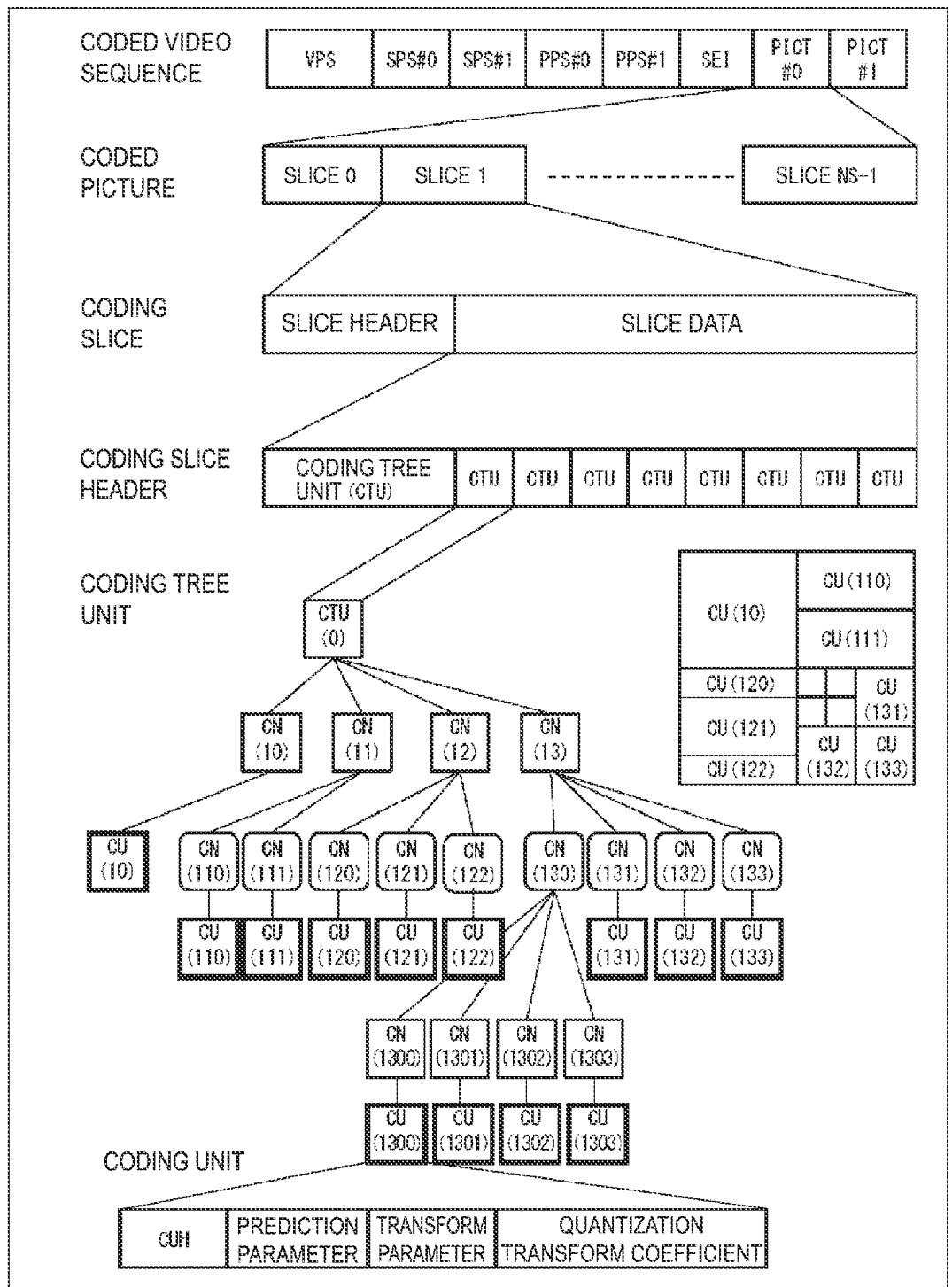
FIG. 4 is a diagram illustrating a hierarchical structure of data of a coding stream.

FIG. 4 is a diagram illustrating a hierarchical structure of data of the coding stream Te. The coding stream Te includes a sequence and multiple pictures constituting the sequence illustratively. FIG. 4 is a diagram illustrating each of a coded video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit.

Coded Video Sequence

In the coded video sequence, a set of data referenced by the video decoding apparatus 31 to decode the sequence SEQ to be processed is defined. As illustrated in the coded video sequence of FIG. 4, the sequence SEQ includes a Video Parameter Set, a Sequence Parameter Set SPS, a Picture Parameter Set PPS, a picture PICT, and Supplemental Enhancement Information SEI.

In the video parameter set VPS, in an image including multiple layers, a set of coding parameters common to multiple images and a set of coding parameters associated with the multiple layers and an individual layer included in the image are defined.

In the sequence parameter set SPS, a set of coding parameters referenced by the video decoding apparatus 31 to decode a target sequence is defined. For example, a width and a height of a picture are defined. Note that multiple SPSs may exist. In that case, any of the multiple SPSs is selected from the PPS.

In the picture parameter set PPS, a set of coding parameters referenced by the video decoding apparatus 31 to decode each picture in a target sequence is defined. For example, a reference value (pic_init_qp_minus26) of a quantization step size used for decoding of a picture, a flag (weighted_pred_flag) indicating an application of a weighted prediction, and a scaling list (quantization matrix) are included. Note that multiple PPSs may exist. In that case, any of the multiple PPSs is selected from each picture in a target sequence.

Coded Picture

In the coded picture, a set of data referenced by the video decoding apparatus 31 to decode the picture PICT to be processed is defined. As illustrated in the coded picture of FIG. 4, the picture PICT includes a slice 0 to a slice NS-1 (NS is the total number of slices included in the picture PICT).

Note that in a case that it is not necessary to distinguish each of the slice 0 to the slice NS-1 below, subscripts of reference signs may be omitted. In addition, the same applies to other data with subscripts included in the coding stream Te which will be described below.

Coding Slice

In the coding slice, a set of data referenced by the video decoding apparatus 31 to decode the slice S to be processed is defined. As illustrated in the coding slice of FIG. 4, the slice includes a slice header and slice data.

The slice header includes a coding parameter group referenced by the video decoding apparatus 31 to determine a decoding method for a target slice. Slice type indication information (slice type) indicating a slice type is one example of a coding parameter included in the slice header.

Examples of slice types that can be indicated by the slice type indication information include (1) I slice using only an intra prediction in coding, (2) P slice using a unidirectional prediction or an intra prediction in coding, and (3) B slice using a unidirectional prediction, a bi-directional prediction, or an intra prediction in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referenced by the video decoding apparatus 31 to decode the slice data to be processed is defined. The slice data includes CTUs as illustrated in the coding slice header in FIG. 4. The CTU is a block of a fixed size (for example, 64×64) constituting a slice, and may be called a Largest Coding Unit (LCU).

Coding Tree Unit

In the coding tree unit of FIG. 4, a set of data is defined that is referenced by the video decoding apparatus 31 to decode the CTU to be processed. The CTU is split into coding unit CUs, each of which is a basic unit of coding processing, by a recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

The CT includes, as CT information, a QT split flag (cu_split_flag) indicating whether or not to perform a QT split, an MT split flag (split_mt_flag) indicating the presence or absence of an MT split, an MT split direction (split_mt_dir) indicating a split direction of an MT split, and an MT split type (split_mt_type) indicating a split type of the MT split. cu_split_flag, split_mt_flag, split_mt_dir, and split_mt_type are transmitted for each coding node.

Figure 5:
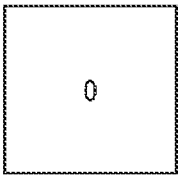
FIG. 5 is a diagram illustrating an example of split of a CTU.

In a case that cu_split_flag is 1, the coding node is split into four coding nodes (QT of FIG. 5).

In a case that cu_split_flag is 0 and split_mt_flag is 0, the coding node is not split and includes one CU as a node (no split of FIG. 5). The CU is an end node of the coding nodes and is not split any further. The CU is a basic unit of coding processing.

In a case that split_mt_flag is 1, the coding node is subjected to the MT split as follows. In a case that split_mt_type is 0, the coding node is horizontally split two coding nodes in a case that split_mt_dir is 1 (BT (horizontal split) of FIG. 5), and the coding node is vertically split into two coding nodes in a case that split_mt_dir is 0 (BT (vertical split) of FIG. 5). In a case that split_mt_type is 1, the coding node is horizontally split into three coding nodes in a case that split_mt_dir is 1 (TT (horizontal split) of FIG. 5), and the coding node is vertically split into three coding nodes in a case that split_mt_dir is 0 (TT (vertical split) of FIG. 5). These are illustrated in the CT information of FIG. 5.

Furthermore, in a case that a size of the CTU is 64×64 pixels, a size of the CU may take any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in the coding unit of FIG. 4, a set of data referred to by the video decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are defined.

There are cases that the prediction processing is performed in units of CU or performed in units of sub-CU in which the CU is further split. In a case that the sizes of the CU and the sub-CU are equal to each other, the number of sub-CUs in the CU is one. In a case that the CU is larger in size than the sub-CU, the CU is split into sub-CUs. For example, in a case that the CU has a size of 8×8, and the sub-CU has a size of 4×4, the CU is split into four sub-CUs which include two horizontal splits and two vertical splits.

As types of prediction (prediction mode CuPredMode), there are at least two types, namely an intra prediction (MODE_INTRA) and an inter prediction (MODE_INTER). There may further be an intra block copy prediction (MODE_IBC). The intra prediction and the intra block copy prediction refer to predictions in an identical picture, and the inter prediction refers to a prediction processing performed between different pictures (for example, between pictures of different display times, and between pictures of different layer images).

Transform and quantization processing is performed in units of CU, but the quantization transform coefficient may be subjected to entropy coding in units of subblock such as 4×4.

Prediction Parameter

A prediction image is derived by prediction parameters accompanying a block. The prediction parameters include prediction parameters for intra prediction and inter prediction.

Configuration of Video Decoding Apparatus

Figure 6:
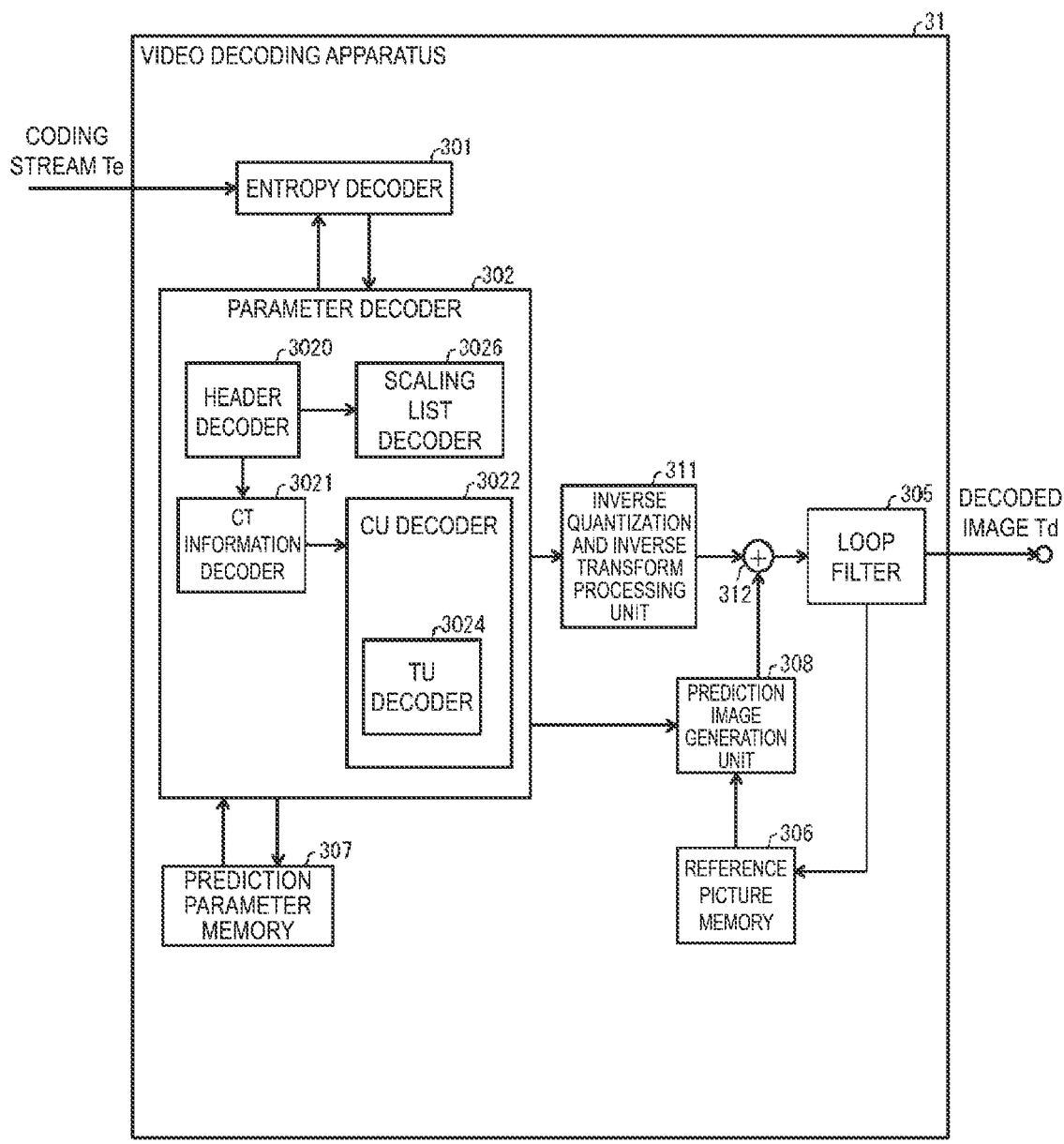
FIG. 6 is a schematic diagram illustrating a configuration of a video decoding apparatus.

The configuration of the video decoding apparatus 31 (FIG. 6) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, and an addition unit 312. Note that a configuration in which the loop filter 305 is not included in the video decoding apparatus 31 may be used in accordance with the video coding apparatus 11 described later.

The parameter decoder 302 further includes a header decoder 3020, a CT information decoder 3021, and a CU decoder 3022 (prediction mode decoder), and the CU decoder 3022 includes a TU decoder 3024. These may be collectively referred to as a decoding module. The header decoder 3020 decodes, from coded data, parameter set information such as the VPS, the SPS, and the PPS, and a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and quantization prediction error (residual_coding) from coded data.

The header decoder 3020 decodes a flag sps_lfnst_enabled_flag indicating whether or not to use non-separable transform from the SPS. In a case that sps_lfnst_enabled_flag is 1, the header decoder 3020 decodes ph_lfnst_enabled_flag from a picture header (PH). In a case that ph_lfnst_enabled_flag does not appear, ph_lfnst_enabled_flag is inferred as 0. Alternatively, in a case that ph_lfnst_enabled_flag does not appear, ph_lfnst_enabled_flag may be set equal to a value of sps_lfnst_enabled_flag.

In a case that ph_lfnst_enabled_flag is 1, the TU decoder 3024 decodes a value lfnst_idx indicating use and a transform basis of non-separable transform from coded data. This has an effect of turning on or off non-separable transform in the SPS or the PH. The non-separable transform has an effect in a picture having few high frequencies and a picture having many diagonal lines; however, in a case of an image having much noise and an image having many fine changes, loss occurs because there is much overhead of lfnst_idx.

Only in a case that mtsIdx is 0, lfnst_idx may be decoded. Alternatively, lfnst_idx may be 0 or 1. lfnst_idx may be derived from an intra prediction mode.

lfnst_idx=lfnst_idx!=0?(IntraPredModeY %2)+1:0

The parameter decoder 302 includes an inter prediction parameter decoder 303 and an intra prediction parameter decoder 304 (not illustrated). The prediction image generation unit 308 includes an inter prediction image generation unit 309 and an intra prediction image generation unit 310.

Furthermore, an example in which a CTU and a CU are used as units of processing is described below, but the processing is not limited to this example, and processing in units of sub-CU may be performed. Alternatively, the CTU and the CU may be replaced with a block, the sub-CU may be replaced with by a subblock, and processing may be performed in units of blocks or subblocks.

The entropy decoder 301 performs entropy decoding on the coding stream Te input from the outside and separates and decodes individual codes (syntax elements). The entropy coding includes a scheme in which syntax elements are subjected to variable length coding by using a context (probability model) that is adaptively selected according to a type of the syntax elements and a surrounding condition, and a scheme in which syntax elements are subjected to variable length coding by using a table or a calculation expression that is determined in advance. In the former Context Adaptive Binary Arithmetic Coding (CABAC), probability models updated for each coded or decoded picture (slice) are stored in memory. Then, as the initial state of the context of a P picture or a B picture, the probability model of a picture using the same slice type and the same slice level quantization parameter is configured out of the probability models stored in the memory. The initial state is used for coding and decoding processing. The separated codes include prediction information to generate a prediction image, a prediction error to generate a difference image, and the like.

The entropy decoder 301 outputs the separated codes to the parameter decoder 302. The separated codes refer to the prediction mode CuPredMode, for example. Which code is to be decoded is controlled based on an indication of the parameter decoder 302.

Basic Flow of Operation

Figure 7:
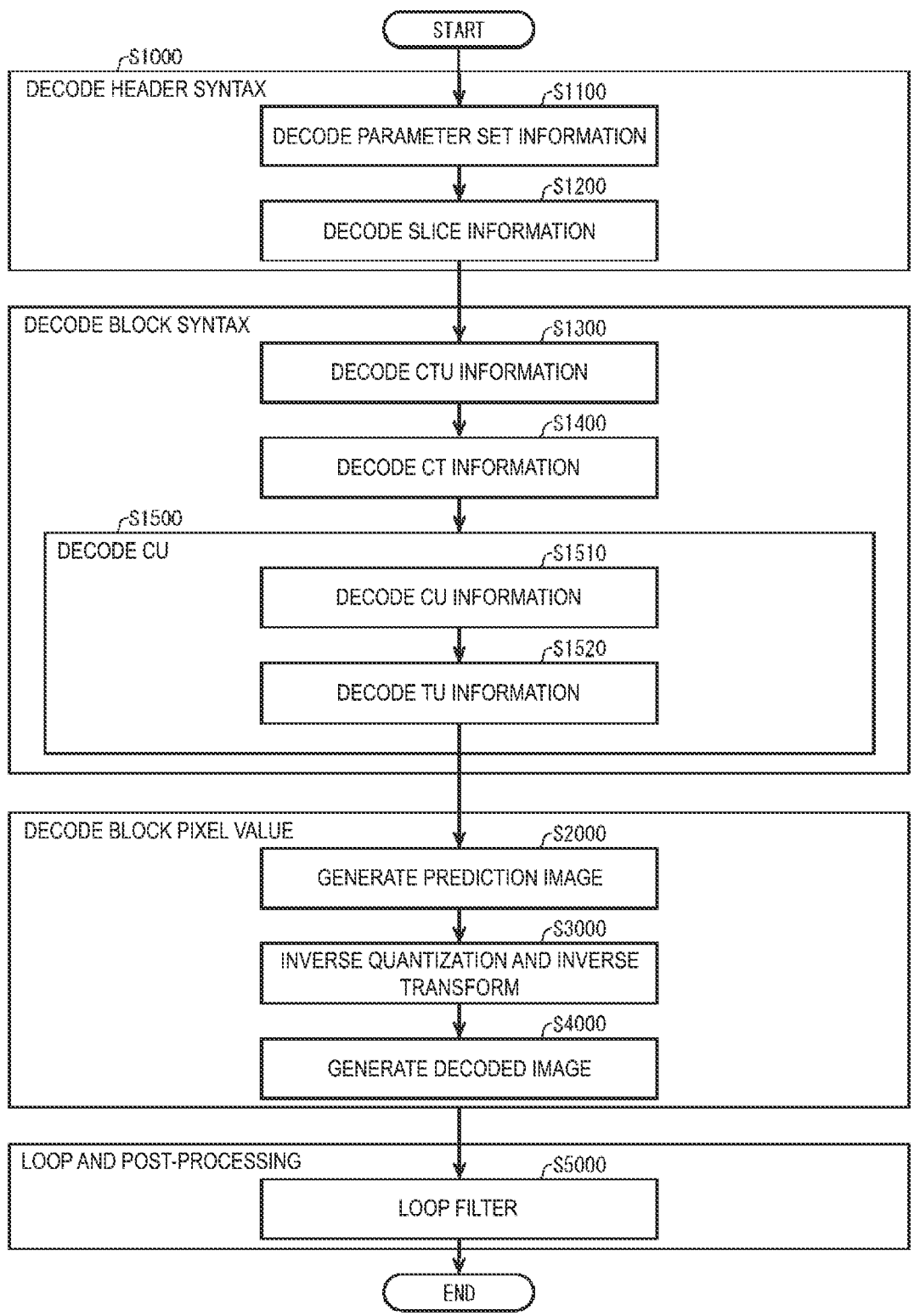
FIG. 7 is a flowchart illustrating general operation of the video decoding apparatus.

FIG. 7 is a flowchart for describing general operation performed in the video decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes, for example, CU information, prediction information, a TU split flag split_transform_flag, CU residual flags cbf_cb, cbf_cr, and cbf_luma from the coded data.

(S1520: Decoding of TU information) In a case that a prediction error is included in the TU, the TU decoder 3024 decodes QP update information (quantization correction value) and a quantization prediction error (residual_coding) from the coded data. Note that the QP update information is a difference value from a quantization parameter prediction value qPpred, which is a prediction value of a quantization parameter QP.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

Scaling Unit 31111

The scaling unit 31111 scales a quantization transform coefficient qd[ ][ ] input from the entropy decoder 301 by using a weight for each coefficient.

Configuration Example of Inverse Quantization and Inverse Transform Processing Unit 311

Figure 8:
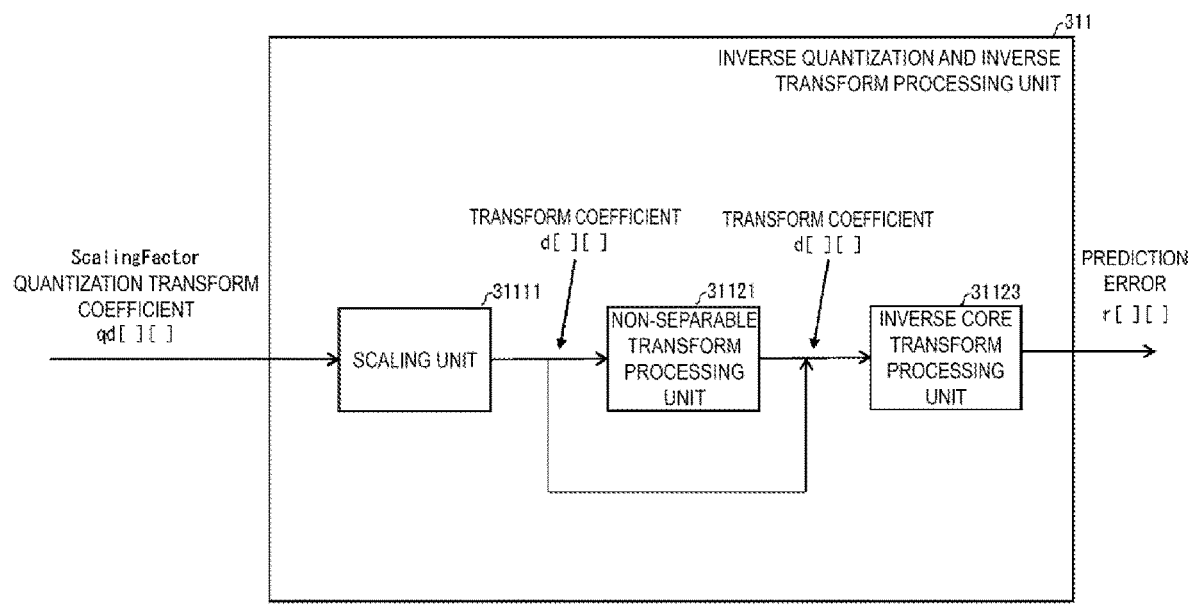
FIG. 8 is a functional block diagram illustrating a configuration example of an inverse quantization and inverse transform processing unit.

FIG. 8 is a block diagram illustrating a configuration of the inverse quantization and inverse transform processing unit 311 according to the present embodiment. The inverse quantization and inverse transform processing unit 311 includes a scaling unit 31111, an inverse non-separable transform processing unit 31121, and an inverse core transform processing unit 31123.

Figure 9:
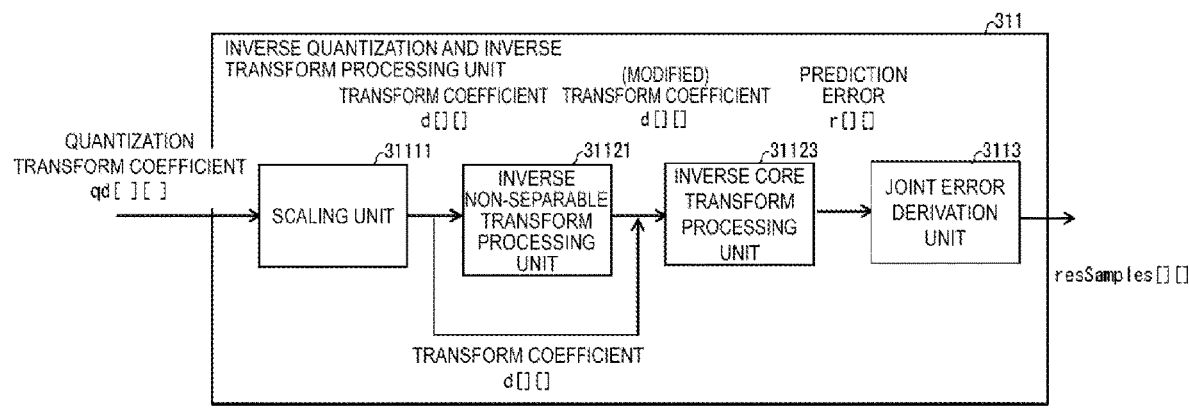
FIG. 9 is a functional block diagram illustrating a configuration example of the inverse quantization and inverse transform processing unit.

FIG. 9 is a block diagram illustrating another configuration of the inverse quantization and inverse transform processing unit 311 according to the present embodiment. The inverse quantization and inverse transform processing unit 311 includes a scaling unit 31111, an inverse non-separable transform processing unit 31121, an inverse core transform processing unit 31123, and a joint error derivation unit 3113. This configuration is obtained by adding the joint error derivation unit 3113 to the configuration of FIG. 8.

The inverse quantization and inverse transform processing unit 311 scales (inverse quantization) the quantization transform coefficient qd[ ][ ] input from the entropy decoder 301, and derives a transform coefficient d[ ][ ] by the scaling unit 31111. The quantization transform coefficient qd[ ][ ] is a coefficient obtained by performing transform such as Discrete Cosine Transform (DCT) and Discrete Sine Transform (DST) on a prediction error and quantizing the transformed prediction error or a coefficient obtained by further performing non-separable transform on the transformed coefficient in coding processing. In a case that lfnst_idx!=0, the inverse quantization and inverse transform processing unit 311 performs inverse transform by the inverse non-separable transform processing unit 31121. Inverse frequency transform such as inverse DCT and inverse DST is further performed on the transform coefficient, and the prediction error is calculated. In a case that lfnst_idx==0, the inverse non-separable transform processing unit 31121 is not performed, and inverse transform such as inverse DCT and inverse DST is performed on the transform coefficient scaled by the scaling unit 31111, and the prediction error is calculated. The inverse quantization and inverse transform processing unit 311 outputs the prediction error to the addition unit 312.

Note that the inverse transform and the transform are opposite processing, and thus the transform and the inverse transform may be replaced with each other for interpretation. Alternatively, the transform may be referred to as forward transform in a case that the inverse transform is referred to as transform. For example, the non-separable transform may be referred to as forward non-separable transform in a case that the inverse non-separable transform is referred to as non-separable transform. The core transform is simply referred to as transform.

Details of Scaling Unit 31111

Details of a scaling factor to which the inverse non-separable transform is applied in the scaling unit 31111 according to the present embodiment will be described.

The scaling unit 31111 may perform scaling by using a second scaling factor different depending on a size of an inverse non-separable transform matrix input from the scaling list decoder 3026.

The scaling unit 31111 performs scaling by using a weight for each coefficient on the transform coefficient decoded by the TU decoder, using a quantization parameter and a scaling factor derived in the parameter decoder 302.

Here, a quantization parameter qP is derived as follows using a color component cIdx of a target transform coefficient and a joint chrominance residual coding flag tu_joint_cbcr_flag.

$qP=qPY(cIdx==0)$ $qP=qPCb(cIdx==1 \&\& tu\_joint\_cbcr\_flag==0)$ $qP=qPCr(cIdx==2 \&\& tu\_joint\_cbcr\_flag==0)$ $qP=qPCbCr(tu\_joint\_cbcr\_flag!=0)$ The scaling unit 31111 derives a value rectNonTsFlag related to a size or a shape from a size (nTbW, nTbH) of a target TU.

rectNonTsFlag=(((Log 2(nTbW)+Log 2(nTbH))&1)
1&& transform_skip_flag[xTbY][yTbY]0)

(xTbY, yTbY) represents top left coordinates of a transform block, and transform_skip_flag is a flag indicating whether or not to skip transform.

The scaling unit 31111 performs the following processing using ScalingFactor[ ][ ] derived in the scaling list decoder 3026 (not illustrated).

In a case that the scaling list is not enabled (scaling_list_enabled_flag==0) or transform skip is used (transform_skip_flag==1), the scaling unit 31111 sets m[x][y]=16. In other words, uniform quantization is performed. scaling_list_enabled_flag is a flag indicating whether or not the scaling list is enabled.

Otherwise (that is, in a case that scaling_list_enabled_flag==1 and transform_skip_flag==0), the scaling unit 31111 uses the scaling list. Here, m[ ][ ] is set as follows.

m[x][y]=ScalingFactor[Log 2(nTbW)][Log 2(nTbH)]
[matrixId][x][y]

Here, matrixId is set depending on the prediction mode of the target TU (CuPredMode), the color component index (cIdx), and whether or not the non-separable transform is applied (lfnst_idx).

In a case that sh_dep_quant_used_flag is 1, the scaling unit 31111 derives a scaling factor ls[x][y] according to the following equation.

ls[x][y]=(m[x][y]*levelScale[rectNonTsFlag][(qP+1)
%6])<<((qP+1)/6)

Otherwise (sh_dep_quant_used_flag=0), the following equation may be used for the derivation.

ls[x][y]=(m[x][y]*levelScale[rectNonTsFlag][qP%6])
<<(qP/6)

Here, levelScale[ ]={{40, 45, 51, 57, 64, 72}, {57, 64, 72, 80, 90, 102}}. sh_dep_quant_used_flag is a flag that is set equal to 1 in a case that dependent quantization is performed and is set equal to 0 in a case that the dependent quantization is not performed.

The scaling unit 31111 derives dnc[ ][ ] from a product of a transform coefficient TransCoeffLevel decoded as the scaling factor ls[ ][ ], and thereby performs the inverse quantization.

dnc[x][y]=(TransCoeffLevel[xTbY][yTbY][cIdx][x]
[y]*ls[x][y]+bdOffset1)>>bdShift1

Here, bdOffset1=1<<(bdShift1−1)

extended_precision_processing_flag is a flag indicating whether or not a high accuracy coding mode is used. The high accuracy coding mode is a decoding mode for performing the inverse transform on the transform coefficient with high accuracy, and is mainly used in a case that a pixel bit depth is high (for example, 10 bits or more).

In the following, a method of changing a value of a table used for scaling simultaneously with switching accuracy of scaling will be described. The scaling unit 31111 according to the present embodiment may derive above bdShift1 using the following equation, based on extended_precision_processing_flag decoded from a parameter set.

log 2TransformRange=extended_precision_processing_flag?BitDepth+5:15

Alternatively, the following may be used.

log 2TransformRange=extended_precision_processing_flag?Max(15,BitDepth+5):15 bdShift1=BitDepth+rectNonTsFlag+(((Log 2($n$TbW)+Log 2($n$TbH))/2)+10−log 2TransformRange+$sh\_dep$_quant_used_flag Here, log 2TransformRange represents a possible range of a value of a transform coefficient, and BitDepth represents a bit depth of a pixel. In a case that extended_precision_processing_flag=1, that is, log 2TransformRange=BitDepth+5, the following equation holds, and the value is 5 or greater.

bdShift1=5+rectNonTsFlag+(((Log 2($n$TbW)+Log 2($n$TbH))/2)+$sh\_dep$_quant_used_flag Alternatively, the scaling unit 31111 according to the present embodiment may derive bdShift1 according to the following, without using extended_precision_processing_flag.

log 2TransformRange=Max(15,BitDepth+5)

bdShift1=BitDepth+rectNonTsFlag+(((Log 2($n$TbW)+Log 2($n$TbH))/2)+10-log 2TransformRange+$sh\_dep$_quant_used_flag In this case, the scaling unit 31111 uses the following value, based on BitDepth (or it may be switched with log 2TransformRange). In a case that BitDepth>10 (that is, log 2TransformRange>15), the following table is used. The following table includes only even-numbered values (S1).

levelScale[ ]={{40,46,52,58,64,72},{58,64,72,80,90,102}}

Otherwise, that is, in a case that BitDepth<=10 (that is, log 2TransformRange==15), the following table is used. The following table includes odd-numbered and even-numbered values (S6).

levelScale[ ]={{40,45,51,57,64,72},{57,64,72,80,90,102}}

Here, in a case that BitDepth>10, all of the values included in quantScale are even numbers.

Finally, the scaling unit 31111 clips the transform coefficient subjected to the inverse quantization and derives d[x][y].

d[x][y]=Clip3(CoeffMin,CoeffMax,dnc[x][y])   (Equation CLIP-1)

CoeffMin and CoeffMax are a minimum value and a maximum value of clipping, respectively.

d[x][y] is transmitted to the inverse core transform processing unit 31123 or the inverse non-separable transform processing unit 31121. The inverse non-separable transform processing unit 31121 applies the inverse non-separable transform to the transform coefficient d[ ][ ] after the inverse quantization and before the core transform.

Inverse Non-Separable Transform Processing Unit 31121

The inverse non-separable transform processing unit 31121 applies transform using a transform matrix to a part or all of the transform coefficients d[ ][ ] received from the scaling unit 31111, and thereby reconstructs the modified transform coefficient (transform coefficient transformed by the non-separable transform processing unit) d[ ][ ]. The inverse non-separable transform processing unit 31121 applies the inverse non-separable transform to the transform coefficient d[ ][ ] for each transform unit TU. The inverse non-separable transform processing unit 31121 outputs the reconstructed modified transform coefficient d[ ][ ] to the inverse core transform processing unit 31123.

Inverse Core Transform Processing Unit 31123

The inverse core transform processing unit 31123 performs transform on the transform coefficient d[ ][ ] or the modified transform coefficient d[ ][ ] and derives a prediction error r[ ][ ]. Then, shift depending on the bit depth (BitDepth) is performed on the r[ ][ ], and an error resSamples[ ][ ] having the same accuracy as a prediction image derived by the prediction image generation unit 308 is derived. For example, shift is expressed as follows.

resSamples[x][y]=(r[x][y]+(1<<(bdShift2−1)))>>bdShift2 bdShift2=Max(20−BitDepth,0)   (Equation BD-1)

In this operation, resSamples[ ][ ] of BitDepth accuracy is obtained from r[ ][ ] of 20-bit accuracy through shift operation. Note that the value indicating accuracy is not limited to 20, and another value between 8 and 24 may be used (the same applies hereinafter). The shift depending on BitDepth may be performed, with a bit depth shift unit (not illustrated) being provided. The derived error is output to the addition unit 312.

Inverse Core Transform Processing Unit 31123

The inverse core transform processing unit 31123 applies the inverse core transform to the output (modified transform coefficient) of the inverse non-separable transform processing unit 31121. Alternatively, the inverse core transform processing unit 31123 may apply the inverse core transform to the output (transform coefficient) of the scaling unit 31111. The inverse core transform processing unit 31123 is a means for performing one-dimensional transform of the vertical direction and the horizontal direction, and is referred to as an inverse transform processing unit.

The inverse core transform processing unit 31123 transforms the (modified) transform coefficient d[ ][ ] to a first intermediate value e[ ][ ] through vertical one-dimensional transform, clips the first intermediate value e[ ][ ], and outputs a second intermediate value g[ ][ ]. The inverse core transform processing unit 31123 transforms g[ ][ ] to a prediction residual r[ ][ ], and the prediction residual r[ ][ ] is transmitted to the addition unit 312.

More specifically, the inverse core transform processing unit 31123 derives a first intermediate value e[x][y] according to the following equation.

e[x][y]=Σ(transMatrix[y][j]×d[x][j])(j=0nTbS−1)

Here, transMatrix[ ][ ] (=transMatrixV[ ][ ]) is a transform basis of nTbS×nTbS derived using trTypeVer. trType is a parameter indicating a type of transform, and includes trTypeVer and trTypeHor. nTbS is a height nTbH of the TU.

The basis of the transform coefficient may be a result of 6-bit integer quantization. All of the values of the transform matrix of DCT after the 6-bit integer quantization are (6+1) bit signed integers, and range from −128 to 127. In this case, the values of the transform matrix related to a DC component (DC coefficient, first component) of DCT (DCT2) are fixed to 6 bits (64), and values of other coefficients, an AC component (AC coefficient, a second or subsequent component) of DCT or a transform matrix of DST range from −127 to 128 described above.

In a case of 4×4 transform (nTbS=4) of DCT2 (trType==0), for example, transMatrix={{64, 64, 64, 64}, {83, 36, −36, −83}, {64, −64, −64, 64}, {36, −83, 83, −36}} is used.

In a case of 4×4 transform (nTbS=4) of DCT7 (trType==1), for example, transMatrix={{29, 55, 74, 84}, {74, 74, 0, −74}, {84, −29, −74, 55}, {55, −84, 74, −29}} is used.

Σ means processing of adding a product of transMatrix [y][j] and d[x][j] regarding j=0 . . . nTbS−1.

The inverse core transform processing unit 31123 shifts and clips the first intermediate value e[x][y] and derives a second intermediate value g[x][y].

$$g[x][y]=Clip3(CoeffMin,CoeffMax,(e[x][y]+trOffset1)>>trShift1)trOffset1=1<<(trShift1-1)$$

trShift1 in the above equation is a numerical value determined by a bit depth trDepth being a transform basis, and may be trShift=trDepth or trDepth+1.

Here, the following equation is used assuming that the transform basis trDepth is 6 bits and trShift1=trDepth+1.

$$g[x][y]=Clip3(CoeffMin,CoeffMax,(e[x][y]+64)>>7)\quad\text{(Equation CLIP-2)}$$

CoeffMin and CoeffMax are a minimum value and a maximum value of clipping, respectively.

The inverse core transform processing unit 31123 derives a transform basis transMatrix[ ][ ] (=transMatrixH[ ][ ]) using trTypeHor. nTbS is a width nTbW of the TU. The horizontal transform processing unit 152123 transforms the second intermediate value g[x][y] to a prediction residual r[x][y] through horizontal one-dimensional transform.

$$r[x][y]=\Sigma transMatrix[x][j]\times g[j][y](j=0\ldots nTbS-1)$$

The above symbol Σ means processing of adding a product of transMatrix[x][j] and g[j][y] regarding j=0 . . . nTbS−1.

As described below, in a case of DCT2, a common value can be used in transform sizes 2, 4, 8, 16, 32, . . . . Thus, only a necessary row (j below) may be used for each size by defining the transform transMatrix of a maximum size instead of defining transform size-dependent transMatrix.

$$e[x][y]=\Sigma transMatrix[y][j*2^{(6-Log\,2(nTbS))}]\times d[x][j])(j=0\ldots nTbS-1)$$

In the present embodiment, accuracies trDepth, trShift1, bdShift2 of the transform coefficient have the following relationship in a case of default operation.

trShift1=trDepth+1 bdShift2=trDepth−1+log 2TransformRange−BitDepth

Here, log 2TransformRange is a logarithm value indicating a range of clipping. In a case that trDepth=6 and log 2TransformRange=15, the following holds, and the operation matches that of a case that extended_precision_processing_flag=0.

trShift1=6+1=7 bdShift2=6−1+15−BitDepth=20−BitDepth extended_precision_processing_flag is a flag indicating whether or not a high bit depth coding mode is used.

Description of Coefficient Shift Operation and Clipping Processing According to Present Embodiment The video decoding apparatus 31 according to an aspect of the present invention includes a header decoder that decodes a high bit depth flag (extended_precision_processing_flag) indicating the high bit depth coding mode in the sequence parameter set SPS. A header coder 1110 of the video coding apparatus 11 according to an aspect of the present invention codes extended_precision_processing_flag. extended_precision_processing_flag mainly targets the pixel bit depth (BitDepth) of 12 bits to 16 bits and enables high accuracy decoding through inverse quantization and adjustment of a clipping value and shift values of the transform coefficient.

Figure 11:
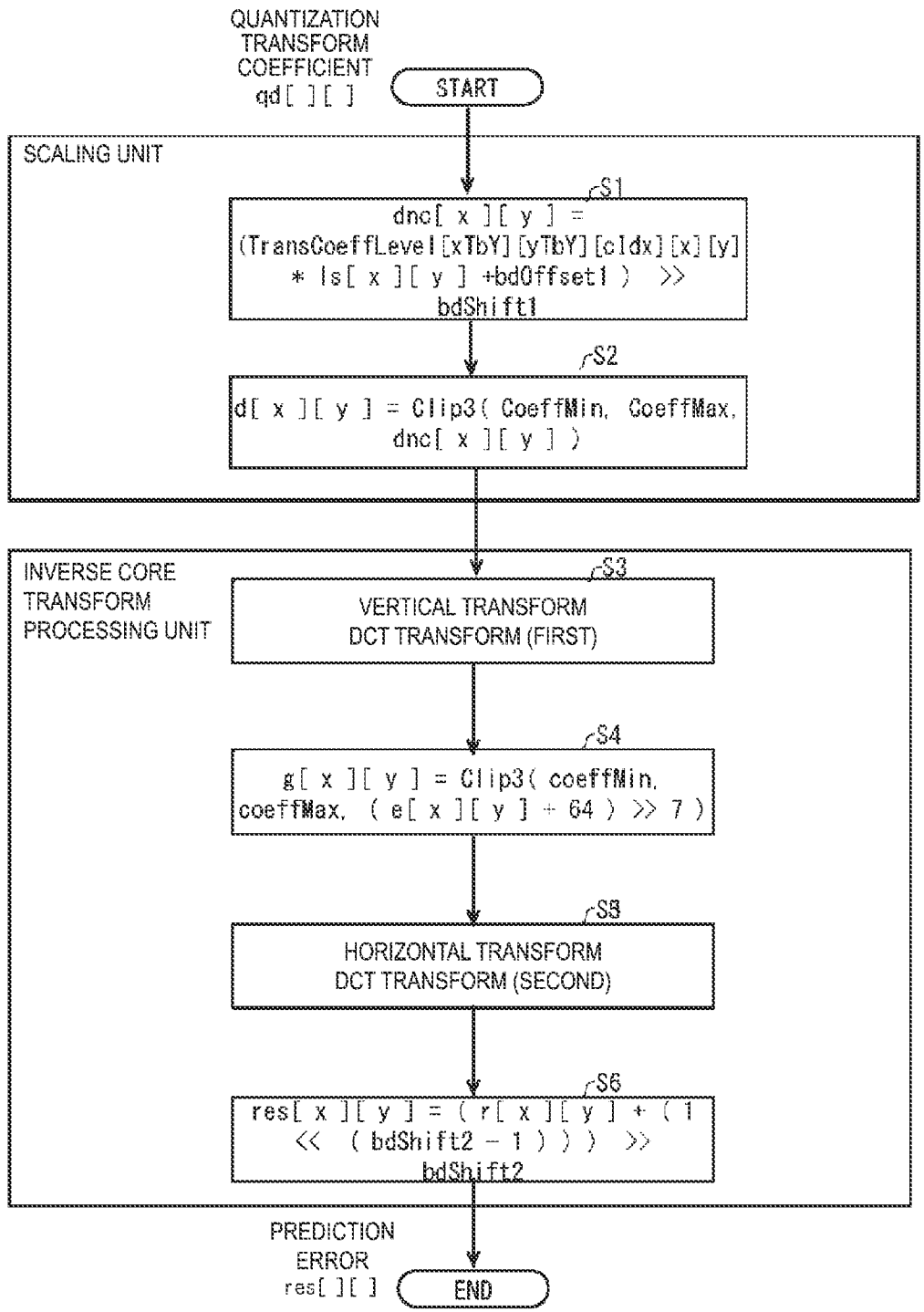
FIG. 11 is a flowchart illustrating inverse quantization and inverse transform (quantization and transform) processing according to an embodiment of the present invention.

FIG. 11 is a flowchart illustrating coefficient shift operation and clipping processing of inverse quantization and inverse transform.

The scaling unit 31111 derives dnc[ ][ ] from a product of the scaling factor ls[ ][ ] and the transform coefficient TransCoeffLevel. Here, first shift operation with a first shift value bsShift1 is performed (S1).

$$dnc[x][y]=(TransCoeffLevel[xTbY][yTbY][cIdx][x][y]*ls[x][y]+bdOffset1)>>bdShift1$$

In a case of transform skip (transform_skip_flag==1), the prediction error r[ ][ ] is derived from the modified transform coefficient d[ ][ ] without performing the inverse transform with bdShift1=10 (fixed value).

$$r[x][y]=d[x][y]$$

In a case other than transform skip (transform_skip_flag==0), above bdShift1 is derived according to the following equation.

log 2TransformRange=extended_precision_processing_flag?
Max(15,BitDepth+6):15 bdShift1=BitDepth+rectNonTsFlag+((Log 2(nTbW)+Log 2(nTbH))/2)+10−log 2TransformRange+sh_dep_quant_used_flag bdOffset1=(1<<bdShift1)>>1     (Equation R-1)

bdShift1 is composed of bdShift1 a depending on the bit depth and a part depending on a block size and a quantization parameter.

bdShift1=bdShift1a+rectNonTsFlag+((Log 2(nTbW)+Log 2(nTbH))/2)+sh_dep_quant_used_flag bdShift1a=BitDepth+10−log 2TransformRange Note that, in a case of extended_precision_processing_flag=0, log 2TransformRange=15 according to Equation (R-1), and thus bdShift1a=BitDepth−5.

Next, the transform coefficient dnc obtained through the inverse quantization is clipped according to the following equation, and d[x][y] is derived (S2).

$$d[x][y]=Clip3(CoeffMin,CoeffMax,dnc[x][y])\quad\text{(Equation CLIP-1)}$$

CoeffMin and CoeffMax are a minimum value and a maximum value of clipping, respectively, and are derived according to the following equation.

CoeffMin=−(1<<log 2TransformRange)

CoeffMax=(1<<log 2TransformRange)−1

In this case, a value range after clipping is limited to a range of signed integers of log 2TransformRange bit. The same clipping value is also used in the following (Equation CLIP-2).

In the following, a case that the inverse non-separable transform is not performed (lfnst_idx=0) will be described.

First, the transform coefficient d[ ][ ] subjected to the clipping processing is subjected to the inverse core transform. The inverse core transform processing unit 31123 performs the vertical transform (first DCT transform) on d[ ][ ], and derives the first intermediate value e[ ][ ] (S3). The inverse core transform processing unit 31123 performs intermediate clipping on e[ ][ ], and derives the second intermediate value g[ ][ ] (S4).

$$g[x][y]=\text{Clip3}(\text{CoeffMin},\text{CoeffMax},(e[x][y]+64)\text{>>}7) \quad \text{(Equation CLIP-2)}$$

64 and 7 in the above equation are numerical values determined by a bit depth (integer quantization accuracy) being a transform basis, and in the above equation, it is assumed that the transform basis is 6 bits. The inverse core transform processing unit 31123 performs the horizontal transform (second DCT transform) on g[ ][ ], and derives r[ ][ ] (S5). The inverse core transform processing unit 31123 performs second shift processing on r[ ][ ] using the second shift value bdShift2, and derives a prediction error res[ ][ ] (S6).

$$\text{res}[x][y]=(r[x][y]+(1\text{<<}(\text{bdShift2}-1)))\text{>>}\text{bdShift2}$$

Here, bdShift2 is derived according to the following equation.

$$\text{bdShift2}=\text{Max}(20-\text{BitDepth},\text{extended\_precision\_processing\_flag}?11:0)$$

FIG. 12(*a*) is a diagram illustrating a relationship between the transform coefficient range log 2TransformRange, the first shift value bdShift1a, and the second shift value bdShift2 in a case that extended_precision_processing_flag=0.

FIG. 12(*b*) is a diagram illustrating a relationship between log 2TransformRange, bdShift1a, and bdShift2 in a case that extended_precision_processing_flag=1.

As illustrated in the figure, in a case that extended_precision_processing_flag=1, by setting bdShift1a to be small and bdShift2 to be large, information lost in the first shift is reduced. By setting log 2TransformRange to be large, there is also an effect of reducing loss of information caused in clipping of an intermediate transform coefficient.

Note that the first transform and the second transform do not depend on the value of extended_precision_processing_flag, and thus a total of two shift amounts is the same regardless of extended_precision_processing_flag.

$$\log 2\text{TransformRange}=\text{extended\_precision\_processing\_flag}?\text{Max}(15,\text{BitDepth}+5):15\text{bdShift2}=\text{Max}(20-\text{BitDepth},\text{extended\_precision\_processing\_flag}?10:0)$$

Second Embodiment

The scaling unit 31111 derives dnc[ ][ ] from a product of the scaling factor ls[ ][ ] and the decoded transform coefficient TransCoeffLevel, and thereby performs the inverse quantization. Description will be given with reference to FIG. 11.

The scaling unit 31111 derives dnc[ ][ ] from a product of the scaling factor ls[ ][ ] and the transform coefficient TransCoeffLevel. Here, first shift operation with the first shift value bsShift1 is performed (S1).

$$\text{dnc}[x][y]=(\text{TransCoeffLevel}[x\text{TbY}][y\text{TbY}][c\text{Idx}][x][y]*ls[x][y]+\text{bdOffset})\text{>>}\text{bdShift1}$$

In a case that transform skip is used (transform_skip_flag==1), the prediction error r[ ][ ] is derived from the modified transform coefficient d[ ][ ] without performing the inverse transform processing with bdShift1=10.

$$r[x][y]=d[x][y]$$

In a case that transform skip is not used (transform_skip_flag==0), bdShift1 is derived according to the following equation.

$$\log 2\text{TransformRange}=\text{extended\_precision\_processing\_flag}?\text{BitDepth}+\text{NC}:15$$

$$\text{bdShift1}=\text{BitDepth}+\text{rectNonTsFlag}+((\text{Log 2}(n\text{TbW})+\text{Log 2}(n\text{TbH}))/2)+10-\log 2\text{TransformRange}+\text{sh\_dep\_quant\_used\_flag} \quad \text{(Equation R-2)}$$

Here, NC is a prescribed constant (for example, from 0 to 10) for bit range adjustment.

$$\text{bdOffset1}=(1\text{<<}\text{bdShift1})\text{>>}1$$

Next, the transform coefficient dnc obtained through the inverse quantization is clipped according to the following equation, and d[x][y] is thereby derived (S2).

$$d[x][y]=\text{Clip3}(\text{CoeffMin},\text{CoeffMax},\text{dnc}[x][y]) \quad \text{(Equation CLIP-1)}$$

CoeffMin and CoeffMax are a minimum value and a maximum value of clipping, respectively, and are derived according to the following equation.

$$\text{CoeffMin}=-(1\text{<<}\log 2\text{TransformRange})$$

$$\text{CoeffMax}=(1\text{<<}\log 2\text{TransformRange})-1$$

In this case, a value range after clipping is limited to a range of signed integers, and the value is expressed with (log 2TransformRange+1) bit. The same clipping value is also used in the following (Equation CLIP-2).

Note that, in a case that extended_precision_processing_flag=1, log 2TransformRange=BitDepth+NC, and thus the range of clipping depends on BitDepth. A difference from the first embodiment is that a maximum value out of BitDepth+NC and 15 is not calculated as in Max(BitDepth+NC, 15). With this, in the second embodiment, there is an effect that BitDepth is cancelled out in a BitDepth-dependent value and the first shift value bdShift1 calculated from log 2TransformRange and a BitDepth-independent value is thereby obtained.

$$\text{bdShift1}=\text{BitDepth}+\text{rectNonTsFlag}+((\text{Log 2}(n\text{TbW})+\text{Log 2}(n\text{TbH}))/2)+10-\log 2\text{TransformRange}+\text{sh\_dep\_quant\_used\_flag}=\text{rectNonTsFlag}+((\text{Log 2}(n\text{TbW})+\text{Log 2}(n\text{TbH}))/2)+10-\text{NC}+\text{sh\_dep\_quant\_used\_flag}$$

$$\text{bdShift1}a=10-\text{NC}$$

In the following, a case that the inverse non-separable transform is not performed (lfnst_idx=0) will be described. First, the transform coefficient d[ ][ ] subjected to the clipping processing is subjected to the inverse core transform. The inverse core transform processing unit 31123 performs the vertical transform (first DCT transform) on d[ ][ ], and derives the first intermediate value e[ ][ ] (S3). The inverse core transform processing unit 31123 performs intermediate clipping on e[ ][ ], and derives the second intermediate value g[ ][ ] (S4).

$$g[x][y]=\text{Clip3}(\text{CoeffMin},\text{CoeffMax},(e[x][y]+64)\text{>>}7) \quad \text{(Equation CLIP-2)}$$

64 and 7 in the above equation are numerical values determined by a bit depth being a transform basis, and in the above equation, it is assumed that the transform basis is 7 bits.

The inverse core transform processing unit 31123 performs the horizontal transform (second DCT transform) on g[ ][ ], and derives r[ ][ ] (S5). The inverse core transform processing unit 31123 performs second shift processing on r[ ][ ] using the second shift value bdShift2, and derives a prediction error res[ ][ ] (S6).

res[x][y]=(r[x][y]+(1<<(bdShift2−1)))>>bdShift2

Here, bdShift2 is derived according to the following equation.

bdShift2=trDepth−1+log 2TransformRange−BitDepth

From (Equation R-2), the following equation is derived.

bdShift2=(extended_precision_processing_flag?NC+(trDepth−1):20−BitDepth)

Note that, in a case that trDepth=6, the following equation is obtained.

bdShift2=(extended_precision_processing_flag?NC+5:20−BitDepth)

FIG. 13 is a diagram illustrating a relationship between the transform coefficient range log 2TransformRange, the first shift value bdShift1a, and the second shift value bdShift2 in a case that extended_precision_processing_flag=1.

Note that, in a case that NC=5, the following equation is obtained.

log 2TransformRange=extended_precision_processing_flag?BitDepth+5:15 bsShift1=rectNonTsFlag+((Log 2(nTbW)+Log 2(nTbH))/2)+5+sh_dep_quant_used_flag bdShift2=(extended_precision_processing_flag?10:20−BitDepth)

Alternatively, the following equation may be used.

bdShift2=extended_precision_processing_flag?10:Max(20−BitDepth,0)

As has been already described above (Equation CLIP-1), the clipping value of (Equation CLIP-2) is derived as follows. The same applies hereinafter.

CoeffMin=−(1<<log 2TransformRange)

CoeffMax=(1<<log 2TransformRange)−1

Depending on whether extended_precision_processing_flag is 1, bdShift1 and bdshift2 may be derived from the following equation for switching whether log 2TransformRange is BitDepht+5 or 15 being a fixed value.

log 2TransformRange=extended_precision_processing_flag?BitDepth+5:15 bdShift1=BitDepth+10−log 2TransformRange+rectNonTsFlag+((Log 2(nTbW)+Log 2(nTbH))/2)+sh_dep_quant_used_flag bdShift2=extended_precision_processing_flag?10:Max(20−bitDepth,0)

In this manner, in a case that BitDepth=10, there is an effect that bsShift1 and bsShift2 are values not depending on extended_precision_processing_flag.

Note that, in a case that NC=6, derivation is performed as follows.

log 2TransformRange=extended_precision_processing_flag?BitDepth+6:15 bsShift1=rectNonTsFlag+((Log 2(nTbW)+Log 2(nTbH))/2)+4+sh_dep_quant_used_flag bdShift2=(extended_precision_processing_flag?11:20−BitDepth)

In this manner, there is an effect that the term bdShift1 a not depending on the block size and the quantization parameter of bsShift1 becomes 0 to have the highest accuracy.

In the second embodiment, in a case that extended_precision_processing_flag is 1, linearly increasing log 2TransformRange depending on BitDepth makes bdShift1 and bdShift2 values not depend on BitDepth.

Supplement

In a case that extended_precision_processing_flag=1, derivation is performed as follows.

log 2TransformRange=BitDepth+NC bdShift1=rectNonTsFlag+((Log 2(nTbW)+Log 2(nTbH))/2)+10−NC+sh_dep_quant_used_flag Trshift1=Trdepth+1=7 bdShift2=NC+trDepth−1=NC+5

Other Example of Configuration Not Changing Processing of BitDepth=10 Using extended_precision_processing_flag The inverse quantization and inverse transform processing unit 311 (the scaling unit 31111 and the inverse core transform processing unit 31123) may derive log 2TransformRange depending on BitDepth within the range not falling below 15, and in a case that extended_precision_processing_flag is 1, the inverse quantization and inverse transform processing unit 311 may derive bdShift1 depending on log 2TransformRange, otherwise derive bdShift1 depending on BitDepth.

log 2TransformRange=Max(BitDepth+5,15)

bdShift1=extended_precision_processing_flag?BitDepth+10−log 2TransformRange: BitDepth−5+rectNonTsFlag+((Log 2(nTbW)+Log 2(nTbH))/2)+sh_dep_quant_used_flag The following configuration may be employed.

log 2TransformRange=(extended_precision_processing_flag && BitDepth>10)?BitDepth+5:15 bdShift1=(extended_precision_processing_flag && BitDepth>10)?BitDepth+10−log 2TransformRange:BitDepth−5+rectNonTsFlag+((Log 2(nTbW)+Log 2(nTbH))/2)+sh_dep_quant_used_flag bdShift2=Max(20−BitDepth,10) or bdShift2=(extended_precision_processing_flag && BitDepth>10)?10:20−BitDepth Method of Changing Accuracy of Transform Coefficient Depending on Size of Transform Block In the following, a method of changing accuracy of transform depending on the size of the transform block will be described. Here, by setting the shift value used for scaling to be small in a case that the transform block is small, accuracy of the transform coefficient input to the inverse core transform processing unit 31123 is enhanced. Processing different from that of the second embodiment will be described.

In (S1), in a case other than transform skip (transform_skip_flag==0), the scaling unit 31111 derives above bdShift1 according to the following equation, depending on the size (nTbW, nTbH) of the transform block. In other words, in a case that extended_precision_processing_flag is 1 and the size of the transform block is equal to or smaller than a prescribed size (8×8), ExtendedPrecisionFlag is set equal to 1 and log 2TransformRange is set equal to a value equal to or greater than 15. ExtendedPrecisionFlag is a flag for increasing accuracy of the transform coefficient.

ExtendedPrecisionFlag=extended_precision_processing_flag
&&(nTbW<=8&& nTbH<=8)

log 2TransformRange=ExtendedPrecisionFlag?BitDepth+NC:15 bdShift1=BitDepth+rectNonTsFlag+(((Log 2(nTbW)+Log 2(nTbH))/2)+10−log 2TransformRange+sh_dep_quant_used_flag bdOffset1=(1<<bdShift1)>>1

NC is a fixed coefficient, and any value from 4 to 6 is appropriately used.

Note that the prescribed size as a threshold is not limited to 8×8 or below, and another size may be used. For example, in a case of 4×4, the following determination equation may be used.

ExtendedPrecisionFlag=extended_precision_processing_flag &&(nTbW<=4&& nTbH<=4)

It may be limited to the transform block of 4×4.

ExtendedPrecisionFlag=extended_precision_processing_flag &&(nTbW==4&& nTbH==4)

It may be limited to the transform block of 4×4 and 8×8.
ExtendedPrecisionFlag=extended_precision_processing_flag && (nTbW==4 && nTbH==4) (nTbW==8 && nTbH==8)

It may be determined by the sum of the width and the height of the transform block.
ExtendedPrecisionFlag=extended_precision_processing_flag && (nTbW+nTbW<=16)

The accuracy of transform may be enhanced depending on the bit depth and the size of transform, without referring to the parameter set flag extended_precision_processing_flag.
ExtendedPrecisionFlag=bitDepth>10 && (nTbW<=8 && nTbH<=8)

In this case as well, other methods already described above may be used for determination of the size.
ExtendedPrecisionFlag=bitDepth>10 && ((nTbW<=4 && nTbH<=8) H (nTbW<=4 && nTbH<=8))

In S6, the inverse core transform processing unit 31123 derives the shift value bdShift2 after the second transform according to the following equation.

bdShift2=ExtendedPrecisionFlag?NC+5:Max(20−BitDepth,0)

According to the configuration, only in a case that the size of the transform block is the prescribed size or smaller, accuracy of the transform coefficient is enhanced. In other words, the shift value bdShift1 in the inverse quantization is reduced to be smaller than a normal value, and the shift value bdShift2 after the second transform for returning to residual accuracy bitDepth is increased. The range CoeffMin, CoeffMax of clipping performed after the first transform is increased only in a case that the size of the transform block is the prescribed size or smaller. With this, in the separable transform, accuracy is increased only in a case that the size of transform is small (for example, from 4 to 8), and thus increase of complexity of operation performed for the transform can be reduced. In other words, by not increasing accuracy of the transform for the transform sizes 16 and 32 and the range of values, increase of complexity caused along with enhancement of accuracy can be reduced.

Method of Changing Accuracy of Transform Coefficient Depending on Type of Transform In the following, a method of changing accuracy of the transform coefficient depending on a type of transform will be described. The accuracy of transform is not changed depending on the transform block size. The present embodiment is substantially the same as "Method of Changing Accuracy of Transform Depending on Size of Transform Block"; however, in a case that extended_precision_processing_flag is 1 and the type of transform is DCT2, ExtendedPrecisionFlag is set equal to 1 and log 2TransformRange is set equal to a value equal to or greater than 15.

ExtendedPrecisionFlag=extended_precision_processing_flag &&(mts_idx==0)

Depending on ExtendedPrecisionFlag, the first shift value bdShift1, the second shift value bdShift2, the accuracy value log 2TransformRange, and the clip values CoeffMin and CoeffMax are set.

Note that the value of mts_idx indicates the types of transforms of the first transform (transform using trTypeVer) and the second transform (transform using trTypeHor) in the separable transform. mts_idx==0 indicates that DCT2 is used for both, and in the above determination, only in a case that mts_idx is 0, that is, the type of transform is DCT2, accuracy of the transform and the threshold of the transform coefficient are enhanced. The following equation may be used.

ExtendedPrecisionFlag=extended_precision_processing_flag &&(trTypeHor==0)&&(trTypeVer==0)

The accuracy of transform may be enhanced depending on the bit depth and the type of transform, without referring to extended_precision_processing_flag.

ExtendedPrecisionFlag=bitDepth>10&&(trTypeHor==0)&&(trTypeVer==0)

According to the above configuration, the processing of enhancing transform accuracy is limited only to the transform of DCT2, and thus increase of complexity caused along with enhancement of accuracy can be reduced.

Method of Changing Accuracy of Transform Depending on Size of Transform Block and Type of Transform In the following, in a case that the transform size is equal to or smaller than the prescribed size and in a case of DCT2, accuracy of the transform coefficient may be changed.

For example, the following configuration may be employed.

ExtendedPrecisionFlag=extended_precision_processing_flag &&(nTbW<=8&& nTbH<=8)&&(trTypeHor==0)&&(trTypeVer==0)

Regardless of extended_precision_processing_flag, in a case that the bit depth is larger than a prescribed value (for example, 10), the size of the transform block is equal to or larger than a prescribed value (for example, 8), and the type of transform is DCT2, accuracy of transform may be enhanced.

ExtendedPrecisionFlag=bitDepth>10&& (nTbW<=8&& nTbH<=8)&& mts_idx==0

According to the above configuration, the processing of enhancing transform accuracy is limited only to the transform of DCT2 whose transform size is equal to or smaller than the prescribed size, and thus increase of complexity caused along with enhancement of accuracy can reduced.

Third Embodiment

In the embodiments described above, in a case that extended_precision_processing_flag is 1, log 2TransformRange is set equal to a BitDepth-dependent value, but log 2TransformRange may be set equal to a BitDepth-independent value. For example, with bdShift2 in a case that extended_precision_processing_flag is 1 being NC, the logarithm value log 2TransformRange of the clipping range may be set equal to a value obtained by adding a prescribed constant (for example, 11) to NC.

log 2TransformRange=extended_precision_processing_flag?NC+11:15

CoeffMin=−(1<<log 2TransformRange)

CoeffMax=(1<<log 2TransformRange)−1 bdShift1=rectNonTsFlag+(((Log 2($n$TbW)+Log 2($n$TbH))/2)+(extended_precision_processing_flag?15−NC:BitDepth−5)+sh_dep_quant_used_flag)

bdShift2=extended_precision_processing_flag?NC:(20−BitDepth)     (Equation R-3)

FIG. 14 illustrates a configuration example of the clipping value and the shift values bdShift1 and bdShift2 according to the present embodiment.

As an example, the following setting may be employed with NC=10.

log 2TransformRange=extended_precision_processing_flag?21:15

CoeffMin=−(1<<log 2TransformRange)

CoeffMax=(1<<log 2TransformRange)−1 bdShift1=rectNonTsFlag+((Log 2($n$TbW)+Log 2($n$TbH))/2)+(extended_precision_processing_flag?5:BitDepth−5)+sh_dep_quant_used_flag bdShift2=extended_precision_processing_flag?10:(20−BitDepth)

Fourth Embodiment

Another example of setting log 2TransformRange being a range of the transform coefficient equal to a fixed value will be described.

For example, the inverse quantization and inverse transform processing unit 311 (the scaling unit 31111 and the inverse core transform processing unit 31123) may switch the range between a certain fixed value NK (NK>15) and another fixed value (15) depending on the flag extended_precision_processing_flag. Specifically, the following equation may be used.

log 2TransformRange=extended_precision_processing_flag?NK:15

CoeffMin=−(1<<log 2TransformRange)

CoeffMax=(1<<log 2TransformRange)−1 bdShift1=BitDepth+10−log 2TransformRange+rectNonTsFlag+((Log 2($n$TbW)+Log 2 ($n$TbH))/2)+sh_dep_quant_used_flag bdShift2=5+log 2TransformRange−BitDepth In other words, the following equation may be used.

bdShift1=BitDepth−(extended_precision_processing_flag?NK−10:5)+rectNonTsFlag+((Log 2($n$TbW)+Log 2($n$TbH))/2)+sh_dep_quant_used_flag bdShift2=(extended_precision_processing_flag?NK+5:20)−BitDepth Here, it is considered that the value of NK is preferably set equal to 18 to 22.

In particular, according to experiments conducted by the inventors of the present invention, it has been revealed that, in a case that NK=20, the most preferable performance can be achieved in all of the experiments with bitDepth=12, 14, 16. Thus, the following setting may be employed.

log 2TransformRange=extended_precision_processing_flag?20:15

CoeffMin=−(1<<log 2TransformRange)

CoeffMax=(1<<log 2TransformRange)−1 bdShift1=BitDepth−(extended_precision_processing_flag?10:5)+rectNonTsFlag+((Log 2($n$TbW)+Log 2($n$TbH))/2)+sh_dep_quant_used_flag bdShift2=(extended_precision_processing_flag?25:20)−BitDepth The method of switching the fixed values is not limited to extended_precision_processing_flag, and a method also using BitDepth may be used. For example, preferable results were achieved in a case of 12 bits or more, and thus the following equation may be used.

log 2TransformRange=(extended_precision_processing_flag && BitDepth>=12)?NK:15

CoeffMin=−(1<<log 2TransformRange)

CoeffMax=(1<<log 2TransformRange)−1 bdShift1=BitDepth−((extended_precision_processing_flag && BitDepth>=12)?NK−10:5)+rectNonTsFlag+((Log 2($n$TbW)+Log 2($n$TbH))/2)+sh_dep_quant_used_flag bdShift2=((extended_precision_processing_flag && BitDepth>=12)?NK+5:20)−BitDepth In the above, NK may be set equal to 18 to 22, and in particular, NK may be set equal to 20. Note that switching in a case that the bit depth is large is not limited to BitDepth>=12, and BitDepth>10 and BitDepth>12 may be used.

According to the above configuration, log 2TransformRange is a fixed value. Thus, CoeffMin and CoeffMax derived from (Equation CLIP-1) and log 2TransformRange of the first inverse DCT clipping (Equation CLIP-2) are also invariably fixed values, and thus calculation is simplified. In a case of exceeding 10 bits as well, high coding efficiency can be implemented.

Configuration of Video Coding Apparatus

Figure 10:
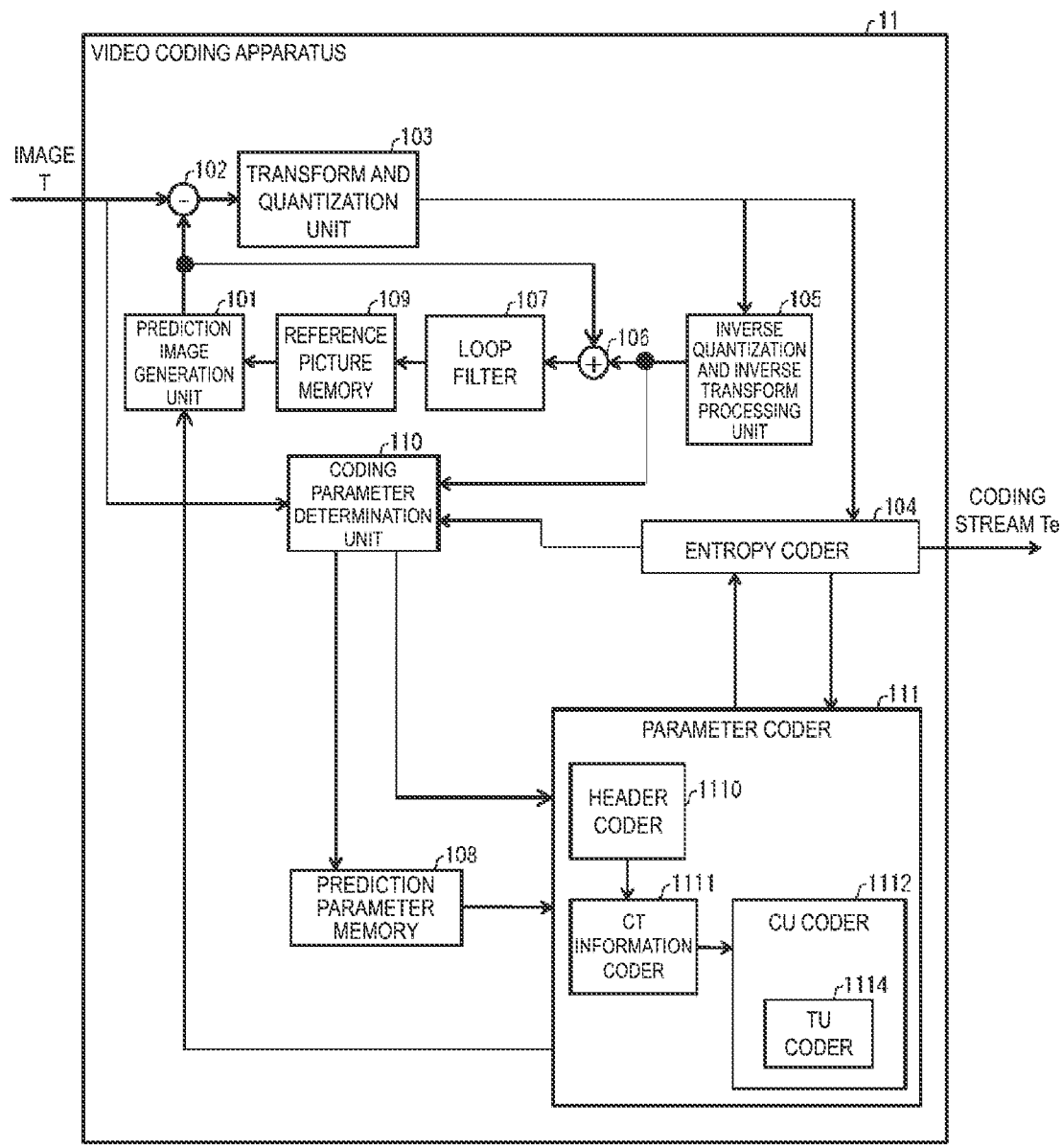
FIG. 10 is a block diagram illustrating a configuration of a video coding apparatus.

Next, a configuration of the video coding apparatus 11 according to the present embodiment will be described. FIG. 10 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, and an entropy coder 104.

The prediction image generation unit 101 generates a prediction image for each CU that is a region obtained by splitting each picture of an image T. The operation of the prediction image generation unit 101 is the same as that of the prediction image generation unit 308 already described, and description thereof will be omitted.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient by quantization. The transform and quantization unit 103 outputs the quantization transform coefficient to the entropy coder 104 and the inverse quantization and inverse transform processing unit 105.

The transform and quantization unit 103 includes a core transform processing unit (first transform processing unit, not illustrated), a non-separable transform processing unit (second transform processing unit, not illustrated), and a scaling unit.

In a case that transform_skip_flag is 0, the core transform processing unit applies the separable transform (the DCT transform or the DST transform) to the prediction error. In a case that transform_skip_flag is 0 and lfnst_idx is other than 0, the non-separable transform processing unit applies the first transform to the transform coefficient after direct transform. After the separable transform or after the non-separable transform processing unit, or with the transform being skipped, the scaling unit quantizes the transform coefficient.

The transform and quantization unit 103 performs processing corresponding to the transform and quantization unit 303 of the video decoding apparatus. Here, log 2TransformRange is derived according to the following equation to correspond to the first embodiment to the third embodiment.

Derivation may be performed according to Equation R-1 of the first embodiment.

$$\log 2TransformRange = extended\_precision\_processing\_flag?Max(15, BitDepth+6):15$$

$$bdShift1 = BitDepth + rectNonTsFlag + ((Log\ 2(nTbW) + Log\ 2(nTbH))/2) + 10 - \log 2TransformRange + sh\_dep\_quant\_used\_flag$$

$$bdShift2 = Max(20-BitDepth, extended\_precision\_processing\_flag?11:0)$$

For example, in a case that extended_precision_processing_flag=0, derivation is performed according to the following equation.

$$bdShift1 = BitDepth + rectNonTsFlag + ((Log\ 2(nTbW) + Log\ 2(nTbH))/2) - 5 + sh\_dep\_quant\_used\_flag$$

$$bdShift2 = 20 - BitDepth$$

In a case that extended_precision_processing_flag=1, derivation is performed according to the following equation.

$$bdShift1 = rectNonTsFlag + ((Log\ 2(nTbW) + Log\ 2(nTbH))/2) + 4 + sh\_dep\_quant\_used\_flag$$

$$bdShift2 = 20$$

Derivation may be performed according to Equation R-2 of the second embodiment.

$$\log 2TransformRange = extended\_precision\_processing\_flag?BitDepth+TC:15$$

$$bdShift1 = BitDepth + rectNonTsFlag + ((Log\ 2(nTbW) + Log\ 2(nTbH))/2) + 10 - \log 2TransformRange + sh\_dep\_quant\_used\_flag$$

$$bdShift2 = (extended\_precision\_processing\_flag?NC+5:20-BitDepth)$$

Derivation may be performed according to Equation R-3 of the third embodiment.

$$\log 2TransformRange = extended\_precision\_processing\_flag?NC+11:15$$

$$\log 2TransformRange = bdShift2 + BitDepth - (trDepth-1) = BitDepth + NC - 5$$

$$bdShift1 = rectNonTsFlag + ((Log\ 2(nTbW) + Log\ 2(nTbH))/2) + (extended\_precision\_processing\_flag?15-NC:BitDepth-5) + sh\_dep\_quant\_used\_flag$$

$$bdShift2 = extended\_precision\_processing\_flag?NC:(20-BitDepth)$$

CoeffMin and CoeffMax are derived according to the following equation using above log 2TransformRange.

$$CoeffMin = -(1 << \log 2TransformRange)$$

$$CoeffMax = (1 << \log 2TransformRange) - 1$$

Core Transform Processing Unit 10323

The core transform processing unit 10323 is a means for performing one-dimensional transform of the horizontal direction and the vertical direction. The core transform processing unit 10323 derives shift values and offsets used for transform according to the following equation.

$$shiftT1 = Log\ 2(nTbW) + BitDepth + trDepth - \log 2TransformRange$$

$$shiftT2 = Log\ 2(nTbH) + trDepth$$

$$offsetT1 = 1 << (shiftT1-1)$$

$$offsetT2 = 1 << (shiftT2-1)$$

trDepth in the above equation is a numerical value determined by accuracy being a transform basis, and in the above equation, trDepth=6 may be used.

The core transform processing unit 10323 derives the transform basis transMatrix[ ][ ] from the difference image d[ ] using trTypeHor, and performs transform using transMatrix and shift and clipping processing.

$$e[x][y] = \Sigma(transMatrix[y][j] \times d[x][j])(j=0..nTbS-1)$$

$$g[x][y] = Clip3(CoeffMin, CoeffMax, (e[x][y] + offsetT1) >> shiftT1)$$

The core transform processing unit 31123 derives the transform basis transMatrix[ ][ ] using trTypeVer, and performs transform using transMatrix and shift and clipping processing.

$$d[x][y] = \Sigma transMatrix[x][j] \times e[j][y] \, (j=0nTbS-1)$$

$$dnc[x][y] = Clip3(CoeffMin, CoeffMax, (d[x][y]+offsetT2) >> shiftT2)$$

Non-separable transform Processing Unit 10321

The non-separable transform processing unit 10321 applies the non-separable transform on the coefficient (transform coefficient) transformed by the core transform processing unit 10323.

Scaling Unit 10311

The scaling unit 10311 transforms the transform coefficient dnc after the core transform or the non-separable transform.

The scaling unit 10311 derives the value rectNonTsFlag related to the shape from the size (nTbW, nTbH) of the target TU. qP is adjusted depending on sh_dep_quant_used_flag.

$$rectNonTsFlag = (((Log\,2(nTbW) + Log\,2(nTbH)) \& 1)$$
$$1 \&\& \, transform\_skip\_flag[xTbY][yTbY]0)$$

$$qP = sh\_dep\_quant\_used\_flag?qP+1:qP$$

The scaling unit 10311 derives bdShift1Enc through the following processing.

$$transformShift = log\,2TransformRange - BitDepth - ((Log\,2(nTbW) + Log\,2(nTbH))/2) - sh\_dep\_quant\_used\_flag$$

$$bdShift1Enc = 14 + (qP/6) + transformShift = log\,2TransformRange - BitDepth - ((Log\,2(nTbW) + Log\,2(nTbH))/2) + (qP/6) - rectNonTsFlag$$

Note that the following relational equation is satisfied between bdShift1 and bdShift1Enc.

$$bdShift1Enc = 14 + (qP/6) - bdShift1$$

bdShift1Enc may be derived based on bdShift1 derived in the image decoding apparatus.

The scaling unit 10311 derives dnc[ ][ ] from the product of the scaling factor ls[ ][ ] and the decoded transform coefficient TransCoeffLevel, and performs the inverse quantization.

$$ls[x][y] = (m[x][y] * quantScale[rectNonTsFlag][qP\%6])$$

$$TransCoeffLevel[x][y] = (dnc[xTbY][yTbY][cIdx][x][y] * ls[x][y] + bdOffset1Enc) >> bdShift1Enc$$

Here, quantScale[ ]={{26214, 23302, 20560, 18396, 16384, 14564}, {18396, 16384, 14564, 13107, 11651, 10280}}.

Finally, the scaling unit 10311 clips the quantized transform coefficient and derives the TransCoeffLevel [x] [y].

$$TransCoeffLevel[x][y] = Clip3(CoeffMin, CoeffMax, TransCoeffLevel[x][y])$$

The inverse quantization and inverse transform processing unit 105 performs the inverse quantization and the inverse transform on TransCoeffLevel and calculates the prediction error. The operation is the same as that of the inverse quantization and inverse transform processing unit 311 (FIG. 8 and FIG. 9) in the video decoding apparatus 31, and descriptions thereof are omitted. The calculated prediction error is output to the addition unit 106.

To the entropy coder 104, the quantization transform coefficient is input from the transform and quantization unit 103, and coding parameters are input from the parameter coder 111. The coding parameters are predMode, for example.

The entropy coder 104 performs entropy coding on the split information, the prediction parameter, the quantization transform coefficient, and the like, and generates and outputs the coding stream Te.

The parameter coder 111 includes a header coder 1110, a CT information coder 1111, a CU coder 1112 (prediction mode coder), an inter prediction parameter coder 112, and an intra prediction parameter coder 113 (not illustrated). The CU coder 1112 further includes a TU coder 1114.

General operation of each module will be described below. The parameter coder 111 performs coding processing of parameters such as header information, split information, prediction information, and quantization transform coefficients.

The CT information coder 1111 codes the QT and MT (BT, TT) split information and the like from the coded data.

The CU coder 1112 codes the CU information, the prediction information, the TU split flag, the CU residual flag, and the like.

In a case that a prediction error is included in the TU, the TU coder 1114 codes the QP update information (quantization correction value) and the quantization prediction error (residual_coding).

The CT information coder 1111 and the CU coder 1112 supply, to the entropy coder 104, syntax elements such as the inter prediction parameter, the intra prediction parameter (intra_luma_mpm_flag, intra_luma_mpm_idx, and intra_luma_mpm_remainder), and the quantization transform coefficient.

Configuration of Intra Prediction Parameter Coder 113

The intra prediction parameter coder 113 derives a format for coding (for example, intra_luma_mpm_idx, intra_luma_mpm_remainder, and the like) from IntraPredMode input from the coding parameter determination unit 110. The intra prediction parameter coder 113 includes a partly identical configuration to a configuration in which the intra prediction parameter decoder 304 derives the intra prediction parameters.

The intra prediction parameter coder 113 is includes a parameter coding controller 1131, a luminance intra prediction parameter derivation unit 1132, and a chrominance intra prediction parameter derivation unit 1133.

To the parameter coding controller 1131, IntraPredModeY and IntraPredModeC are input from the coding parameter determination unit 110. The parameter coding controller 1131 refers to mpmCandList[ ] of an MPM candidate list derivation unit 30421, and determines intra_luma_mpm_flag. Then, intra_luma_mpm_flag and IntraPredModeY are output to the luminance intra prediction parameter derivation unit 1132. IntraPredModeC is output to the chrominance intra prediction parameter derivation unit 1133.

The luminance intra prediction parameter derivation unit 1132 includes an MPM candidate list derivation unit 30421 (a candidate list derivation unit), the MPM parameter derivation unit 11322, and the non-MPM parameter derivation unit 11323 (a coder, a derivation unit).

The MPM candidate list derivation unit 30421 refers to the intra prediction mode of neighboring blocks stored in the prediction parameter memory 108, and derives mpmCandList[ ]. In a case that intra_luma_mpm_flag is 1, the MPM parameter derivation unit 11322 derives intra_luma_mpm_idx from IntraPredModeY and mpmCandList[ ], and outputs intra_luma_mpm_idx to the entropy coder 104.

In a case that intra_luma_mpm_flag is 0, the non-MPM parameter derivation unit 11323 derives RemIntraPredMode from IntraPredModeY and mpmCandList[ ], and outputs intra_luma_mpm_remainder to the entropy coder 104.

The chrominance intra prediction parameter derivation unit 1133 derives intra_chroma_pred_mode from IntraPredModeY and IntraPredModeC and outputs intra_chroma_pred_mode.

The addition unit 106 adds a pixel value of the prediction image of the block input from the prediction image generation unit 101 and the prediction error input from the inverse quantization and inverse transform processing unit 105 to each other for each pixel, and generates a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the multiple sets, an RD cost value indicating the magnitude of an amount of information and a coding error. The coding parameter determination unit 110 selects a set of coding parameters of which cost value calculated is a minimum value. In this manner, the entropy coder 104 outputs a set of selected coding parameters as the coding stream Te. The coding parameter determination unit 110 stores the determined coding parameters in the prediction parameter memory 108.

Note that, some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coder 104, the inverse quantization and inverse transform processing unit 105, the loop filter 107, the coding parameter determination unit 110, and the parameter coder 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains the program for a short period of time, such as a communication wire that is used to transmit the program over a network such as the Internet or over a communication line such as a telephone line, and a medium that retains the program for a certain period of time, such as a volatile memory within the computer system which functions as a server or a client in a case that the program is transmitted via the communication wire. Furthermore, the aforementioned program may be configured to implement part of the functions described above, and also may be configured to be capable of implementing the functions described above in combination with a program already recorded in the computer system.

Furthermore, a part or all of the video coding apparatus 11 and the video decoding apparatus 31 in the embodiments described above may be realized as an integrated circuit such as a Large Scale Integration (LSI). Each function block of the video coding apparatus 11 and the video decoding apparatus 31 may be individually realized as processors, or part or all may be integrated into processors. A circuit integration technique is not limited to the LSI, and may be implemented with a dedicated circuit or a general-purpose processor. Furthermore, in a case that advances in semiconductor technology lead to the advent of a circuit integration technology that replaces an LSI, an integrated circuit based on the circuit integration technology may be used.

The embodiments of the present invention have been described in detail above referring to the drawings, but the specific configuration is not limited to the above embodiments and various amendments can be made to a design that fall within the scope that does not depart from the gist of the present invention.

APPLICATION EXAMPLES

The above-mentioned video coding apparatus 11 and the video decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

First, referring to FIG. 2, it will be described that the above-mentioned video coding apparatus 11 and the video decoding apparatus 31 can be utilized for transmission and reception of videos.

Figure 2:
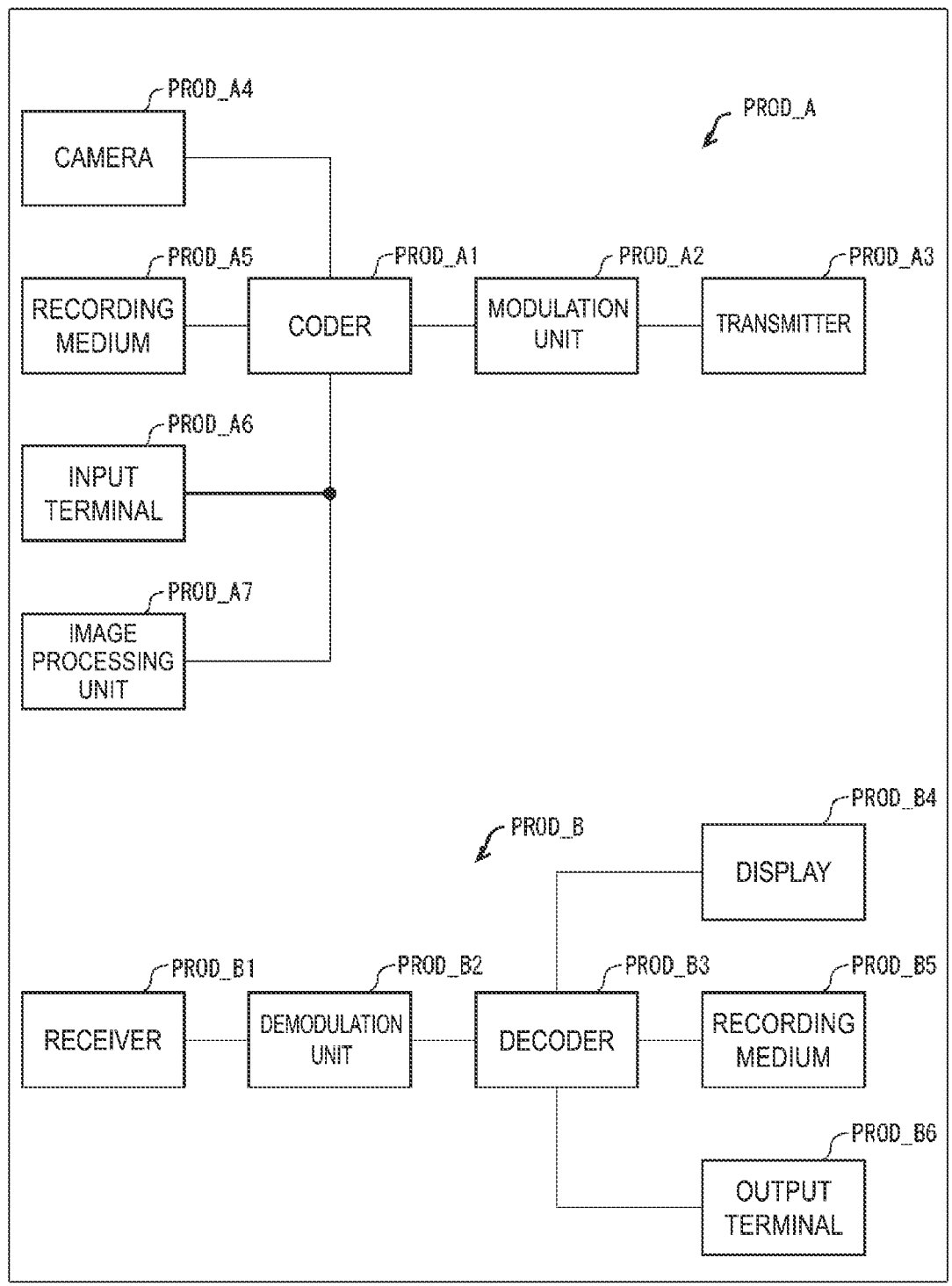
FIG. 2 is a diagram illustrating configurations of a transmitting apparatus equipped with a video coding apparatus and a receiving apparatus equipped with a video decoding apparatus according to the present embodiment. PROD_A illustrates the transmitting apparatus equipped with the video coding apparatus, and PROD_B illustrates the receiving apparatus equipped with the video decoding apparatus.

FIG. 2 illustrates a block diagram illustrating a configuration of a transmitting apparatus PROD_A installed with the video coding apparatus 11. As illustrated in FIG. 2(*a*), the transmitting apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in the diagram, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

FIG. 2 illustrates a block diagram illustrating a configuration of a receiving apparatus PROD_B installed with the video decoding apparatus 31. As illustrated in the diagram, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in the diagram, some of the constituents may be omitted.

Note that the recording medium PROD_B5 may record videos which are not coded, or may record videos which are coded in a coding scheme for recording different from a coding scheme for transmission. In the latter case, a coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Next, referring to FIG. 3, it will be described that the above-mentioned video coding apparatus 11 and the video decoding apparatus 31 can be utilized for recording and regeneration of videos.

Figure 3:
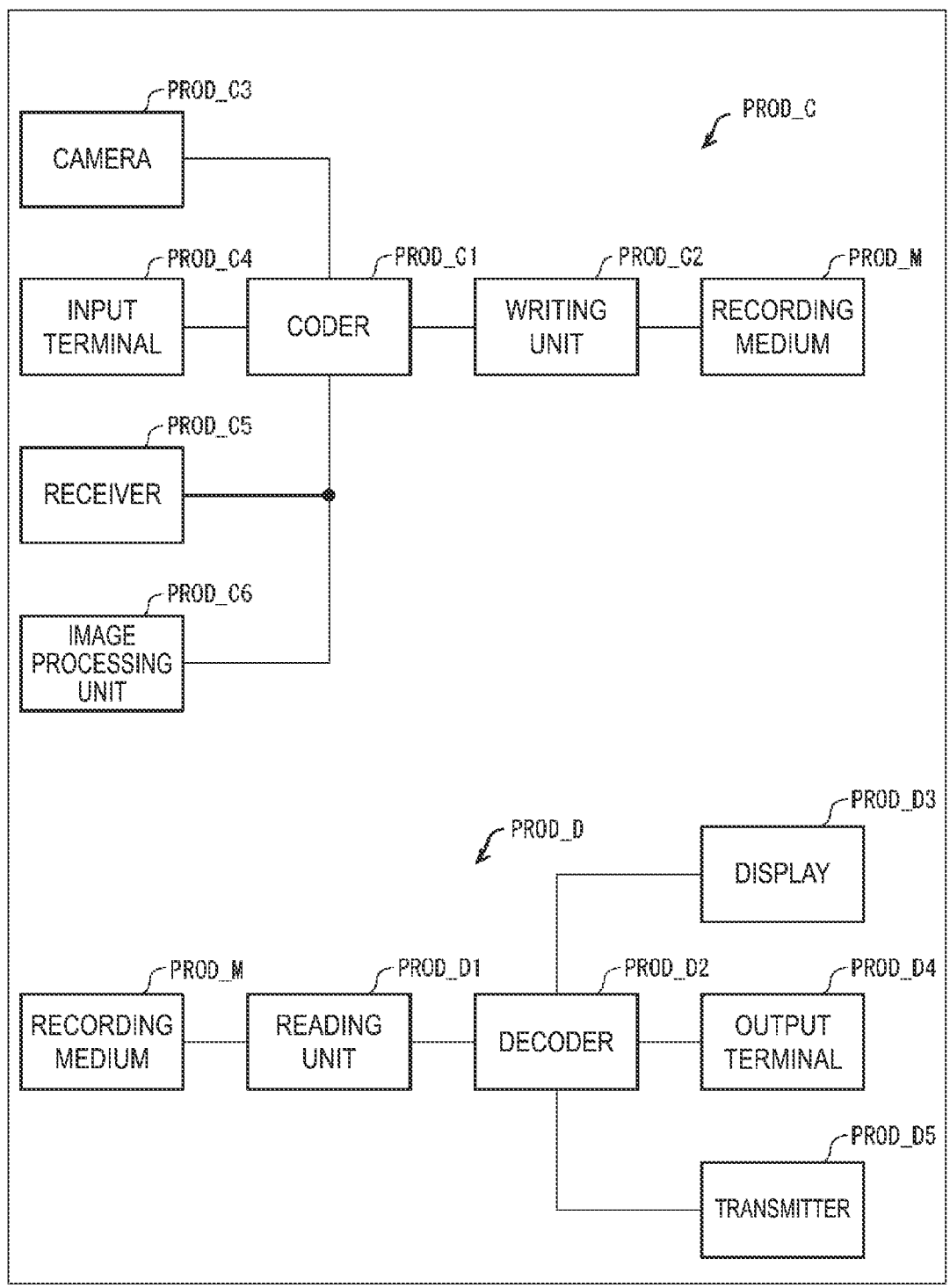
FIG. 3 is a diagram illustrating configurations of a recording apparatus equipped with the video coding apparatus and a reconstruction apparatus equipped with the video decoding apparatus according to the present embodiment. PROD_C illustrates the recording apparatus equipped with the video coding apparatus, and PROD_D illustrates the reconstruction apparatus equipped with the video decoding apparatus.

FIG. 3 illustrates a block diagram illustrating a configuration of a recording apparatus PROD_C installed with the above-mentioned video coding apparatus 11. As illustrated in FIG. 3(a), the recording apparatus PROD_C includes a coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in the diagram, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 3 illustrates a block diagram illustrating a configuration of a reconstruction apparatus PROD_D installed with the above-mentioned video decoding apparatus 31. As illustrated in the diagram, the reconstruction apparatus PROD_D includes a reading unit PROD_D1 which reads coded data written in the recording medium PROD_M, and a decoder PROD_D2 which obtains a video by decoding the coded data read by the reading unit PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in the diagram, some of the constituents may be omitted.

Note that the transmitter PROD_D5 may transmit a video which is not coded or may transmit coded data coded in the coding scheme for transmission different from a coding scheme for recording. In the latter case, a coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each of the above-described apparatuses includes a CPU that executes a command of a program to implement each of functions, a Read Only Memory (ROM) that stores the program, a Random Access Memory (RAM) to which the program is loaded, and a storage apparatus (recording medium), such as a memory, that stores the program and various kinds of data. In addition, an objective of the embodiments of the present invention can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or an MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD: trade name)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EE-PROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present invention can be also realized in the form of computer data signals embedded in a carrier such that the transmission of the program codes is embodied in electronic transmission.

The embodiments of the present invention are not limited to the above-described embodiments, and various modifications are possible within the scope of the claims. That is, an embodiment obtained by combining technical means modified appropriately within the scope defined by claims is included in the technical scope of the present invention as well.

INDUSTRIAL APPLICABILITY

An aspect of the present invention can be preferably applied to a video decoding apparatus that decodes coded data in which image data is coded, and a video coding apparatus that generates coded data in which image data is coded. The embodiments of the present invention can be preferably applied to a data structure of coded data generated by the video coding apparatus and referred to by the video decoding apparatus.

The invention claimed is:

1. A video decoding apparatus comprising:
a header decoding circuit configured to decode an extended precision flag in a sequence parameter set, wherein the extend precision flag indicates whether a high bit depth coding mode is used; and
an inverse quantization and inverse transform processing circuit configured to, for each transform unit, perform inverse quantization and perform inverse transform on a transform coefficient, wherein
the header decoding circuit is further configured to derive a transform coefficient range, which is set to one of (i) a value obtained by using a bit depth and (ii) an integer value according to a value of the extended precision flag, and
the inverse quantization and inverse transform processing circuit is further configured to:
 derive a first shift value by using the transform coefficient range in a case that a value of a transform skip flag, indicating whether a transform is applied, is equal to zero,
 derive the first shift value without using the transform coefficient range in a case that the value of the transform skip flag is equal to one,
 derive a transform coefficient value by performing a right shift operation by using the first shift value, and
 derive a scaled transform coefficient by performing a clipping operation on the transform coefficient value by using a coefficient minimum value and a coefficient maximum value, wherein the coefficient minimum value and the coefficient maximum value are derived based on the transform coefficient range.

2. A video coding apparatus comprising:
a header coding circuit configured to code an extended precision flag in a sequence parameter set, wherein the extended precision flag indicates whether a high bit depth coding mode is used; and
an inverse quantization and inverse transform processing circuit configured to, for each transform unit, perform inverse quantization and perform inverse transform on a transform coefficient, wherein
the inverse quantization and inverse transform processing circuit is further configured to:
 derive a first shift value by using the transform coefficient range in a case that a value of a transform skip flag, indicating whether a transform is applied, is equal to zero,
 derive the first shift value without using the transform coefficient range in a case that the value of the transform skip flag is equal to one,
 derive a transform coefficient value by performing a right shift operation by using the first shift value, and
 derive a scaled transform coefficient by performing a clipping operation on the transform coefficient value by using a coefficient minimum value and a coefficient maximum value, wherein the coefficient minimum value and the coefficient maximum value are derived based on the transform coefficient range, and
the header coding circuit is further configured to derive a transform coefficient range, which is set to one of (i) a value obtained by using a bit depth and (ii) an integer value according to a value of the extended precision flag.

* * * * *